United States Patent
Gundavelli et al.

(10) Patent No.: US 12,004,025 B2
(45) Date of Patent: Jun. 4, 2024

(54) SUPPORTING HANDOVERS IN HYBRID CELL CONFIGURATION ENVIRONMENTS

(71) Applicant: Cisco Technology, Inc., San Jose, CA (US)

(72) Inventors: Srinath Gundavelli, San Jose, CA (US); Indermeet Singh Gandhi, San Jose, CA (US); Mark Grayson, Maidenhead (GB); Arun G. Khanna, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 314 days.

(21) Appl. No.: 17/320,552

(22) Filed: May 14, 2021

(65) Prior Publication Data

US 2022/0369182 A1 Nov. 17, 2022

(51) Int. Cl.
*H04W 36/00* (2009.01)
*H04W 36/08* (2009.01)

(52) U.S. Cl.
CPC . *H04W 36/0072* (2013.01); *H04W 36/00835* (2018.08); *H04W 36/08* (2013.01)

(58) Field of Classification Search
CPC . H04W 24/02; H04W 36/08; H04W 36/0061; H04W 36/0083; H04W 36/00835; H04W 36/14; H04W 36/18; H04W 48/18; H04W 48/20; H04W 8/26; H04W 48/16
See application file for complete search history.

(56) References Cited

U.S. PATENT DOCUMENTS

| | | | |
|---|---|---|---|
| 2013/0003695 A1 | 1/2013 | Nylander et al. | |
| 2013/0235785 A1* | 9/2013 | Sebire | H04W 36/0085 370/312 |
| 2013/0237225 A1 | 9/2013 | Martin | |
| 2015/0016299 A1 | 1/2015 | Zhang et al. | |

(Continued)

FOREIGN PATENT DOCUMENTS

| | | |
|---|---|---|
| CN | 108235339 A | 6/2018 |
| CN | 111918297 A | 11/2020 |

(Continued)

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 16)," 3GPP TS 36.413 V16.4.0 (Jan. 2021), Technical Specification, Jan. 2021, 423 pages.

(Continued)

*Primary Examiner* — Nam T Huynh
(74) *Attorney, Agent, or Firm* — Edell, Shapiro & Finnan, LLC

(57) ABSTRACT

Presented herein are techniques to support handovers in hybrid cell configuration environments. In one example, a method may include determining that a user equipment (UE) is connected to a first shared cell or a first unique cell of a radio access network; and causing a handover for the UE to a second shared cell or a second unique cell of the radio access network based on whether the UE is connected to the first shared cell or the first unique cell, wherein the handover is performed between one of the first shared cell and the second shared cell or the first unique cell and the second unique cell.

20 Claims, 10 Drawing Sheets

(56) References Cited

U.S. PATENT DOCUMENTS

| | | |
|---|---|---|
| 2015/0271683 A1 | 9/2015 | Yan et al. |
| 2015/0296449 A1 | 10/2015 | Shu et al. |
| 2016/0037550 A1 | 2/2016 | Barabell et al. |
| 2017/0105112 A1 | 4/2017 | Park et al. |
| 2019/0141586 A1 | 5/2019 | Olsson et al. |
| 2019/0223055 A1 | 7/2019 | Bor Yaliniz et al. |
| 2020/0029338 A1 | 1/2020 | Lee et al. |
| 2020/0045583 A1 | 2/2020 | Kim et al. |
| 2020/0053005 A1 | 2/2020 | Balasubramanian et al. |
| 2020/0053622 A1 | 2/2020 | Huang-Fu et al. |
| 2020/0092758 A1 | 3/2020 | Youn et al. |
| 2020/0092774 A1* | 3/2020 | Sharma ........... H04W 36/00835 |
| 2020/0127785 A1 | 4/2020 | Blankenship et al. |
| 2020/0128432 A1 | 4/2020 | Youn et al. |
| 2020/0154350 A1 | 5/2020 | Dao et al. |
| 2020/0187085 A1 | 6/2020 | Jagannatha et al. |
| 2020/0204252 A1 | 6/2020 | Barbieri et al. |
| 2020/0275348 A1 | 8/2020 | Park et al. |
| 2020/0314950 A1 | 10/2020 | Dao et al. |
| 2020/0351702 A1 | 11/2020 | Stojanovski et al. |
| 2020/0383009 A1 | 12/2020 | Qiao et al. |
| 2020/0389835 A1 | 12/2020 | Talebi Fard et al. |
| 2020/0412438 A1 | 12/2020 | Yang et al. |
| 2021/0022024 A1 | 1/2021 | Yao et al. |
| 2021/0051545 A1 | 2/2021 | Luo et al. |
| 2021/0243839 A1 | 8/2021 | Krishnaswamy et al. |
| 2022/0078631 A1* | 3/2022 | Salahuddeen ..... H04W 28/0864 |
| 2022/0264415 A1 | 8/2022 | Khirallah et al. |
| 2022/0303847 A1* | 9/2022 | Wu ....................... H04W 76/18 |
| 2022/0377507 A1 | 11/2022 | Xie et al. |

FOREIGN PATENT DOCUMENTS

| | | |
|---|---|---|
| EP | 2757844 A1 | 7/2014 |
| WO | 2014163570 A1 | 10/2014 |
| WO | 2017/173259 A1 | 10/2017 |
| WO | 2020/100053 A1 | 5/2020 |
| WO | 2020069067 A1 | 4/2021 |
| WO | 2021071397 A1 | 4/2021 |

OTHER PUBLICATIONS

3GPP, "3rd Generation Partnership Project; Technical Specification Group Radio Access Network; NR; Radio Resource Control (RRC) protocol specification (Release 16)," 3GPP TS 38.331 V16.4.1 (Mar. 2021), Technical Specification, Mar. 2021, 949 pages.

3GPP, "3rd Generation Partnership Project; Technical Specification Group Radio Access Network; NG-RAN; Xn application protocol (XnAP) (Release 16)," 3GPP TS 38.423 V16.4.0 (Jan. 2021), Technical Specification, Jan. 2021. 457 pages.

3GPP, "3rd Generation Partnership Project; Technical Specification Group Radio Access Network; NG-RAN; F1 application protocol (F1AP) (Release 16)," 3GPP TS 38.473 V16.5.0 (Apr. 2021), Technical Specification, Apr. 2021, 463 pages.

Share Technote, "5G/NR—Beam Management," https://www.sharetechnote.com/html/5G/5G_Phy_BeamManagement.html, retrieved Apr. 26, 2021, 14 pages.

Patel, et al., "5G meets Time Sensitive Networking," https://www.ericsson.com/en/blog/2018/12/5g-meets-time-sensitive-networking, Dec. 18, 2018, 7 pages.

O-RAN Alliance, "O-RAN Fronthaul Control, User and Synchronization Plane Specification 5.0," O-RAN.WG4.CUS.0-v05.00, Technical Specification, Nov. 2020, 291 pages.

Metaswitch, "What is 5G beamforming, beam steering and beam switching with massive MIMO," https://www.metaswitch.com/knowledge-center/reference/what-is-beamforming-beam-steering-and-beam-switching-with-massive-mimo, retrieved Apr. 26, 2021, 6 pages.

Cisco, "Operator Specific QCI," MME Administration Guide, StarOS Release 21.20, https://www.cisco.com/c/en/us/td/docs/wireless/asr_5000/21-20_6-14/MME-Admin/21-20-mme-admin/21-17-MME-Admin_chapter_01000001.html, Jul. 2020, 6 pages.

3GPP, "3rd Generation Partnership Project; Technical Specification Group Core Network and Terminals; Non-Access-Stratum (NAS) protocol for 5G System (5GS); Stage 3; (Release 17)," 3GPP TS 24.501 V17.2.1 (Apr. 2021), Technical Specification, Apr. 2021, 758 pages.

3GPP, "3rd Generation Partnership Project; Technical Specification Group Services and System Aspects; System architecture for the 5G System (5GS); Stage 2 (Release 17)," 3GPP TS 23.501 V17.0.0 (Mar. 2021), Technical Specification, Mar. 2021, 489 pages.

Wikipedia, "Cell Global Identity," https://en.wikipedia.org/wiki/Cell_Global_Identity, Jan. 2020, 3 pages.

3GPP, "3rd Generation Partnership Project; Technical Specification Group Radio Access Network; NR; Radio Resource Control (RRC) protocol specification (Release 16)," 3GPP TS 38.331 V16.3.1 (Jan. 2021), Technical Specification, Jan. 2021, 932 pages.

3GPP, "3rd Generation Partnership Project; Technical Specification Group Radio Access Network; NR; NR and NG-RAN Overall Description; Stage 2 (Release 16)," 3GPP TS 38.300 V16.5.0 (Mar. 2021), Technical Specification, Mar. 2021, 151 pages.

Techplayon, "5G NR Physical Cell ID (PCI) Planning," https://www.techplayon.com/5g-nr-physical-cell-id-pci-planning/, Nov. 2019, 4 pages.

3GPP, "3rd Generation Partnership Project; Technical Specification Group Services and System Aspects; Security architecture and procedures for 5G system (Release 17)," 3GPP TS 33.501 V17.1.0 (Mar. 2021), Technical Specification, Mar. 2021, 256 pages.

3GPP, "3rd Generation Partnership Project; Technical Specification Group Services and System Aspects; Policy and charging control framework for the 5G System (5GS); Stage 2 (Release 17)," 3GPP TS 23.503 V17.0.0 (Mar. 2021), Technical Specification, Mar. 2021, 128 pages.

Derham, et al., "3GPP WLAN integration in 5G System—Release 17," IEEE 802.11-19/1215r0, https://mentor.ieee.org/802.11/dcn/19/11-19-1215-00-AANI-3gpp-wlan-integration-in-5g-system-rel-17.pptx, Jul. 2019, 11 pages.

3GPP, "3rd Generation Partnership Project; Technical Specification Group Radio Access Network; Evolved Universal Terrestrial Radio Access (E-UTRA) and NR; Multi-connectivity; Stage 2 (Release 16)," 3GPP TS 37.340 V16.5.0 (Mar. 2021), Technical Specification, Mar. 2021, 84 pages..

O-RAN Alliance, "O-RAN Fronthaul Working Group Control, User and Synchronization Plane Specification 3.0," O-RAN.WG4.CUS.0-v03.00, Technical Specification, Apr. 2020, 253 pages.

* cited by examiner

SUPPORTING HANDOVERS IN HYBRID CELL CONFIGURATION ENVIRONMENTS

TECHNICAL FIELD

The present disclosure relates to network equipment and services.

BACKGROUND

Networking architectures have grown increasingly complex in communications environments, particularly mobile networking environments. In particular, virtualized Radio Access Network (vRAN) architectures have been developed to provide radio coverage for mobile networks. However, there are significant challenges in managing radio access for vRAN architectures in order to provide services for user equipment.

DESCRIPTION OF EXAMPLE EMBODIMENTS

Overview

Figure 1:
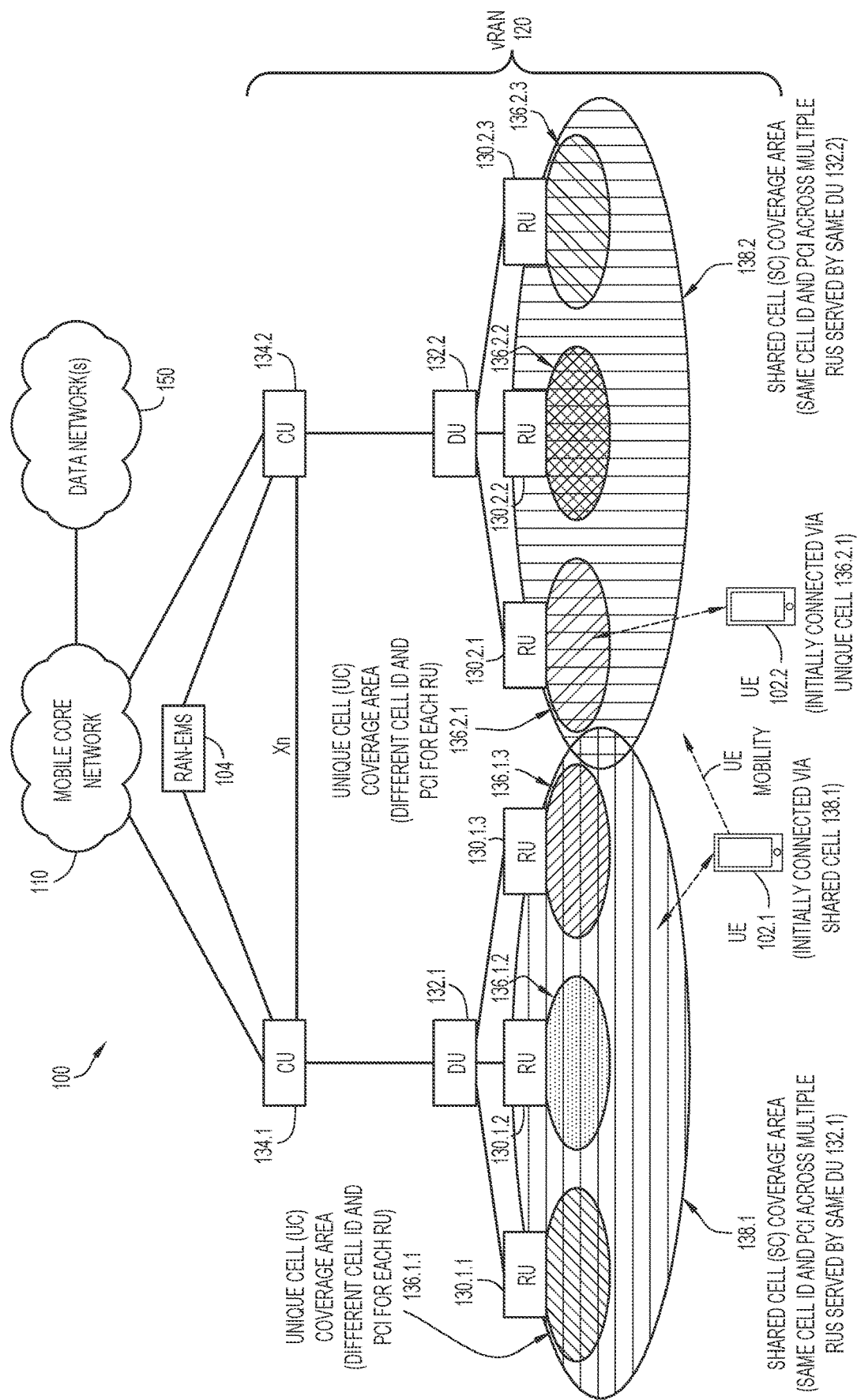
FIG. 1 is a diagram of a system in which techniques may be implemented to support handovers in a hybrid cell configuration environment, according to an example embodiment.

With enterprise networks moving towards the concept of a hybrid cell mode to efficiently manage different types of user equipment/devices and/or applications, handovers remain a gap as devices across factory floors. Currently, there is no guarantee that a user equipment (UE), when performing handovers and being attached to a source cell being operated in a given operating mode in a hybrid cell virtualized Radio Access Network (vRAN) configuration (e.g., a shared cell mode or a unique cell mode), will handover to a target cell that is operating in the same operating mode as the source cell. Techniques herein fill this gap by providing for the ability to assist a UE during a handover in order to allow the UE to handover to a target cell that is operating in a same mode as the source cell.

In one embodiment, a method is provided that may include determining that a user equipment (UE) is connected to a first shared cell or a first unique cell of a radio access network; and causing a handover for the UE to a second shared cell or a second unique cell of the radio access network based on whether the UE is connected to the first shared cell or the first unique cell, wherein the handover is performed between one of the first shared cell and the second shared cell or the first unique cell and the second unique cell.

Example Embodiments

As referred to herein, an 'enterprise' or 'enterprise entity' may be considered to be a business, government, educational institution, an organization, and/or the like that may include multiple enterprise locations (or sites), such as a main campus, remote branches, any operating environment of private 5G (e.g., factory floor, port, mining facility, electric grid, etc.) and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger, for example, up to a ratio of 1:5, depending on spectrum and power regulations) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/ services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a Standalone Non-Public Network (SNPN) or a Public Network Integrated Non-Public Network (PNI-NPN) in some instances. Cisco is a registered trademark of Cisco Technology, Inc.

Discussed herein are features associated with virtualized Radio Access Network (vRAN) architectures that may be provided for different radio accesses. In some instances, a vRAN architecture can be implemented as a disaggregated vRAN architecture that includes the split of a base station, such as a gNB, into a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. In some instances, such as for shared cell vRAN architectures as discussed in further detail herein, multiple DUs (each interfacing with corresponding RU(s)) can interface with a CU-CP component and a CU-UP component.

Referring to FIG. 1, FIG. 1 is a block diagram of a system 100 in which techniques may be implemented to support handovers in a hybrid cell configuration environment, according to an example embodiment.

System 100 includes a number of UEs 102 including a first UE 102.1 (also referred to herein as UE 102.1) and a second UE 102.2 (also referred to herein as UE 102.2), a RAN Element Management System (RAN-EMS) 104, a mobile core network 110, and a vRAN 120, which may be inclusive of a disaggregated vRAN 120. In at least one embodiment, vRAN 120 may be any combination of a 4G/5G/nG-RAN. In at least one embodiment, mobile core network 110 may be representative of any combination of a 4G/5G/nG core network. One or more data network(s) 150 are also shown in FIG. 1.

The vRAN 120 may include a number of first radio units (RUs) 130.1, including RU 130.1.1, RU 130.1.2, and RU 130.1.3, each of which may interface with a first distributed unit (DU) component 132.1 (also referred to herein as first DU or DU 132.1), which may further interface with a first central (or centralized) unit (CU) component 134.1 (also referred to herein as first CU or CU 134.1). The vRAN 120 may further include a number of second RUs 130.2, including RU 130.2.1, RU 130.2.2, and RU 130.2.3, each of which may interface with a second DU component 132.2 (also referred to herein as second DU or DU 132.2), which may further interface with a second CU component 134.2 (also referred to herein as second CU or CU 134.2)

As illustrated in FIG. 1, CU 134.1 and CU 134.2 can interface with each other via a 3GPP Xn interface. CU 134.1 and CU 134.2 can further interface with RAN-EMS 104 and the mobile core network 110. The mobile core network 110 may also interface with data network(s) 150.

An RU, such as any of RUs 130.1.1-130.1.3 and 130.2.1-130.2.3, may implement any combination of a WWA (e.g., cellular) and/or WLA (e.g., Wi-Fi®) air interface for any combination of Radio Access Technology (RAT) types (sometimes referred to more generally as 'accesses') for vRAN 120 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as any of UEs 102, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE. The coverage area of a radio node such as an eNB, gNB, RU, etc. is typically referred to as a 'cell' in which one or more UE may attach to the radio node that serves the coverage area/cell such that service connection to a network may be facilitated via the cell provided by the radio node.

A DU (also sometimes referred to as a baseband unit), such as DU 132.1 and 132.2, may provide lower level operations of the radio signal processing stack, such as Radio Link Control (RLC), Medium Access Control (MAC), and higher PHY layer operations, such as digital processing, including signal modulation and demodulation, channel encoding and decoding, and scheduling, among others. A CU, such as CU 134, may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU can be varied depending on implementation and/or configuration of a given vRAN/network architecture. A CU, such as CU 134.1 and CU 134.2, can also operate to DU(s), such as DU 132.1 and DU 132.2, for a vRAN architecture via Resource Control (RRC) functions and the control plane part of the PDCP protocol. In some embodiments, each of CU 134.1 and CU 134.2 may be further disaggregated into a CU-CP component and a CU-UP component.

In addition to radio signal processing operations, CU 134.1, CU 134.2, DU 132.1, DU 132.2, RUs 130.1.1-130.1.3, and RUs 130.2.1-130.2.3 may perform additional operations as discussed for various embodiments herein.

A UE, such as any of UEs 102.1-102.2, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWW/WLA interface, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks. As referred to herein, the terms 'UE' and 'UE device' can be used interchangeably.

Mobile core network 110 may be configured as any combination of a (private or non-private) 4G/LTE core, typically referred to as the Evolved Packet Core or System (EPC/EPS), 5G core or system (5GC/5GS), next Generation (nG) core or system (e.g., a Sixth Generation (6G) core/system, etc.), and/or the like as may be defined by 3GPP or other similar standards and may include any components, network elements, etc. in order to facilitate operations discussed herein. For example, in one instance for a 5G/nG mobile network core, each of CU 134.1 and CU 134.2 can interface with a 3GPP Access and Mobility Management Function (AMF) within the core and with one or more 3GPP User Plane Functions (UPFs) within the core. It is to be understood that other network elements may be configured for mobile core network 110 for any combination of 3G/4G/5G/nG implementations, such as, a Policy Control Function (PCF), a Policy and Charging Rules Function (PCRF), a Network Slice Selection Function (NSSF), a Network Repository Function (NRF), a Unified Data Management (UDM) service, a Unified Data Repository (UDR), a Session Management Function (SMF), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

In various embodiments, the data network(s) 150 of FIG. 1 may be any combination of the Internet, an Internet Protocol (IP) Multimedia Subsystem (IMS), Ethernet network, Ethernet switching system(s), and/or the like.

Generally, RAN-EMS 104 may operate to configure, update, and/or otherwise manage resources for vRAN 120 via CU 134.1, CU 134.2, DU 132.1, DU 132.2, and RUs 130.1.1, 130.1.2, 130.1.3, 130.2.1, 130.2.2, and 130.2.3. Although not illustrated in FIG. 1, one or more policy servers/databases may be provided for maintaining/storing one or more policies for vRAN 120 and/or UEs 102 in accordance with embodiments described herein. In some instances, RAN-EMS 104 and a policy server/database may be implemented as a combined element. For example, in some instances, RAN-EMS 104 and a policy server/database may be implemented as any combination of a Cisco® Digital Network Architecture Center (DNA-C), a Cisco® RAN Element Management System (RAN-EMS), an enterprise domain controller, including Meraki® cloud, and/or the like. Meraki® is a registered trademark of Meraki, LLC, a wholly owned subsidiary of Cisco Systems, Inc. In one instance, a policy server may be implemented as a Cisco® Identity Services Engine (ISE), which may support any combination of Remote Authentication Dial-In User Service (RADIUS) and/or Diameter protocols.

A RAN, such as vRAN 120, can be configured to operate in two modes: a) unique cell configuration/operating mode, and b) shared cell configuration/operating mode. Generally, the unique cell mode is the most widely used configuration/operating mode where in which each RU operates as a unique cell with a unique cell identifier. Current public cellular networks often operate in the unique cell mode.

The shared cell mode is a special configuration/operating mode in which multiple RUs that are part of a shared cell form to become one giant cell, sometimes referred to as a 'super cell'. In this configuration mode, all the RUs that are part of this giant cell share the same cell identifiers and often operate in the same frequency bands. As referred to herein, shared cells and unique cells can be referred to as cell types.

The identifiers that provide a unique identity to a cell, whether configured as unique cell or a shared cell, are Physical Cell Identifier (PCI), and Cell Global Identity (CGI). The term 'PCI' is typically used in reference to 4G/LTE implementations, whereas the term 'New Radio PCI' (NR-PCI) is typically used in reference to 5G-New Radio (5G-NR) implementations. Further, CGI for 4G/LTE implementations is referred to as Evolved Universal Mobile Telecommunications System (UMTS) Terrestrial Radio Access Network (E-UTRAN) CGI (E-CGI) and CGI for 5G-NR is referred to as NR-CGI or NCGI.

A shared cell configuration has many advantages. For example, all RUs that are part of shared cell can all serve a given UE at any given point of time. A transmitted frame from a given UE will be received by all of the RUs in their RF reachability range. The implication of this is that the UE is not required to perform handovers as it moves from one RF connection with one RU to an RF connection with another RU within the same shared cell, meaning there are no handovers within the same shared cell. The shared cell mode also eliminates any cell border interference issues, as all the RUs are operating in the same frequency bands. Additionally, the shared cell operating mode offers improved reliability over the unique cell operating mode, as there may be more than one RU receiving a frame transmitted by a given UE operating in the shared cell operating mode.

The shared cell configuration/operating mode can be very useful in industrial applications, such as factory floor automation applications in which Ultra-Reliable and Low-Latency Communication (URLLC) type or level service is a baseline requirement. The traffic profile of these types of services dictate a very low handover latency and high-reliability (in the order of packet losses less than 1 in million packets). The shared cell configuration mode, with its inherent spatial diversity properties is well suited for such sensitive applications.

System 100 may provide for a new mode, referred to as a 'hybrid cell configuration mode' or, more broadly, a 'hybrid cell', for use in enterprise private 5G/nG deployments via vRAN 120. In particular, a new hybrid cell approach is provided in which an RU/cell can be operated in both shared cell and unique cell configuration/operating modes concurrently.

Accordingly, vRAN 120, may be configured to provide 3GPP private 4G/LTE, 5G/NR, and/or CBRS mobile network services via mobile core network 110 functions (e.g., EPC/5GC functions) along with CU 134.1, DU 132.1, and respective RUs 130.1.1, 130.1.2, and 130.1.3 through respective unique cell (UC) coverage areas 136.1.1 (provided by RU 130.1.1 in at least one embodiment), 136.1.2 (provided by RU 130.1.2 in at least one embodiment), and 136.1.3 (provided by RU 130.1.3 in at least one embodiment) and a shared cell (SC) coverage area 138.1 (provided by all of RUs 130.1.1, 130.1.2, and 130.1.3 in at least one embodiment) and also via CU 134.2, DU 132.2, and respective RUs 130.2.1, 130.2.2, and 130.2.3 through respective unique cell (UC) coverage areas 136.2.1 (provided by RU 130.2.1 in at least one embodiment), 136.2.2 (provided by RU 130.2.2 in at least one embodiment), and 136.2.3 (provided by RU 130.2.3 in at least one embodiment) and a shared cell (SC) coverage area 138.2 (provided by all of RUs 130.2.1, 130.2.2, and 130.2.3 in at least one embodiment).

As referred to herein, the terms 'cell coverage area' and 'cell' may be referred to interchangeably. For example, the terms unique cell coverage area 136.1.1 and unique 136.1.1 may be used interchangeably, the terms unique cell coverage area 136.1.2 and unique cell 136.1.2 may be used interchangeably, the terms unique cell coverage area 136.1.3 and unique 136.1.3 may be used interchangeably, the terms unique cell coverage area 136.2.1 and unique cell 136.2.1 may be used interchangeably, the terms unique cell coverage area 136.2.2 and unique cell 136.2.2 may be used interchangeably, and the terms unique cell coverage area 136.2.3 and unique cell 136.2.3 may be used interchangeably, the terms shared cell coverage area 138.1 and shared cell 138.1 may be used interchangeably, and the terms shared cell coverage area 138.2 and shared cell 138.2 may be used interchangeably.

Each respective unique cell coverage area 136.1.1, 136.1.2, and 136.1.3 is provided by each respective RU 130.1.1, 130.1.2, and 130.1.3 in which each unique cell coverage area provided by each respective RU is not shared with the other RUs operated by CU 134.1/DU 132.1. As such, each respective RU 130.1.1, 130.1.2, and 130.1.3 broadcasts a different cell identity (ID) (i.e., CGI such as E-CGI/NR-CGI) and PCI/NR-PCI for each respective unique cell coverage area 136.1.1, 136.1.2, and 136.1.3. In contrast, shared cell coverage area 138.1 is provided by and shared among all RUs 130.1.1-130.1.3. Thus, all RUs 130.1.1, 130.1.2, and 130.1.3 may broadcast a same cell ID (E-CGI/NR-CGI) and PCI/NR-PCI for the shared cell coverage area 138.1.

Further, shared cell coverage area 138.2 is provided by and shared among all RUs 130.2.1, 130.2.2, and 130.2.3. Thus, all RUs 130.2.1, 130.2.2, and 130.2.3 may broadcast a same cell ID (E-CGI/NR-CGI) and PCI/NR-PCI for the shared cell coverage area 138.2. However, it is to be understood that the cell ID (E-CGI/NR-CGI) and PCI/NR-PCI for shared cell 138.1 will be different than the cell ID and PCI for shared cell 138.2. Further, each respective unique cell coverage area 136.2.1, 136.2.2, and 136.2.3 is provided by each respective RU 130.2.1, 130.2.2, and 130.2.3 in which each unique cell coverage area provided by each respective RU is not shared with the other RUs operated by CU 134.2/DU 132.2. As such, each respective RU 130.2.1, 130.2.2, and 130.2.3 broadcasts a different cell ID and PCI for each respective unique cell coverage area 136.2.1, 136.2.2, and 136.2.3.

Thus, in the hybrid cell deployment, such as shown for the disaggregated vRAN 120 of FIG. 1, RUs 130.1.1-130.1.3 operated by CU 134.1/DU 132.1 can be configured as hybrid cells such that they can act like a single shared cell to serve one or more UEs 102 via shared cell coverage area 138.1 provided across all the RUs 130.1.1-130.1.3 and, further, each respective RU 130.1.1, 130.1.2, and 130.1.3 can also provide each of a respective unique coverage area 136.1.1, 136.1.2, and 136.1.3. Thus, each respective RU 130.1.1, 130.1.2, and 130.1.3 broadcasts a different cell identity (ID) (E-CGI/NR-CGI) and PCI/NR-PCI for each respective unique cell coverage area 136.1.1, 136.1.2, and 136.1.3 and all of RUs 130.1.1, 130.1.2, and 130.1.3 may broadcast a same cell ID (E-CGI/NR-CGI) and PCI/NR-PCI for the shared cell coverage area 138.1 that is also different from each respective unique cell E-CGI/NR-CGI and PCI/NR-PCI.

Additionally, RUs 130.2.1-130.2.3 operated by CU 134.2/DU 132.2 can be configured as hybrid cells such that they can act like a single shared cell to serve one or more UEs 102 via shared cell coverage area 138.2 provided across all the RUs 130.2.1-130.2.3 and, further, each respective RU 130.2.1, 130.2.2, and 130.2.3 can also provide each of a respective unique cell coverage area 136.2.1, 136.2.2, and 136.2.3. Thus, each respective RU 130.2.1, 130.2.2, and 130.2.3 broadcasts a different cell identity (ID) (E-CGI/NR-CGI) and PCI/NR-PCI for each respective unique cell coverage area 136.2.1, 136.2.2, and 136.2.3 (that is also different from the E-CGI/NR-CGI and PCI/NR-PCI for unique cells 136.1.1-136.1.3 and shared cell 138.1) and all of RUs 130.1.1, 130.1.2, and 130.1.3 may broadcast a same cell ID (E-CGI/NR-CGI) and PCI/NR-PCI for the shared cell coverage area 138.2 that is also different from each respective unique cell E-CGI/NR-CGI and PCI/NR-PCI and is also different from the E-CGI/NR-CGI and PCI/NR-PCI for shared cell 138.1.

As referred to herein, a unique cell may also be referred to interchangeably as a non-shared cell. Thus, the terms 'unique cell operating mode' and 'non-shared cell operating mode' can be used herein interchangeably. As shown in the embodiment of FIG. 1, three unique/non-shared cells and one shared cell are illustrated; however, it is to be understood that the example number of unique/non-shared cells and shared cells and/or the number of RUs forming a shared cell can be varied depending on implementation.

Further, it is to be understood that per-RU 130.1.1, 130.1.2, and 130.1.3 shared cells/coverage areas (which may be partially or wholly overlapping, as generally illustrated for unique cell coverage areas 136.1.1, 136.1.2, and 136.1.3), can also overlap the shared cell coverage area 138.1. Further, per-RU 130.2.1, 130.2.2, and 130.2.3 shared cells/coverage (which may be partially or wholly overlapping, as generally illustrated for unique cell coverage areas 136.2.1, 136.2.2, and 136.2.3), can also overlap the shared cell coverage area 138.2. Further, although illustrated as having no coverage gaps, in some instances RF gaps may be present for the shared cell coverage area 138.1 and shared cell coverage area 138.2. In some instances, an RU may support one or multiple shared cells. In some instances, multiple other DUs and CUs may be present within system 100 in which each additional other DU/CU can support one or more RUs also providing hybrid/non-hybrid cells.

Although embodiments herein discuss that each RU operates in a hybrid configuration to provide unique and shared cell coverage areas, it is to be understood that one or more RUs for a vRAN implementation may operate in a non-hybrid mode by providing only unique cell or shared cell coverage. For example, in at least one embodiment, at least two of RUs 130.1.1, 130.1.2, and 130.1.3 may operate in the hybrid mode to provide both shared cell 138.1 and their corresponding unique cell, whereas the other of the at least two RUs may operate in a non-hybrid mode and may either provide only the shared cell 138.1 or only a corresponding unique cell. Other hybrid/non-hybrid configurations can also be provided for RUs 130.2.1, 130.2.2, and 130.2.3 in accordance with various embodiments herein.

In some embodiments, beam resources can be configured for the unique and shared cells. Generally, the allocation of a device to beam resources can be used by a DU when selecting which beams to use for serving a particular UE. In at least one embodiment the number of shared cell RUs forming a shared cell to serve a particular UE in active mode can be varied such that N out of M total (where N≤M) RUs can be used to transmit downlink (DL) for a specific UE.

Generally, a beamformed system can use a plurality of antenna elements to adapt the composite antenna gain pattern generated by the antenna elements. The system can apply a set of amplitude and phase weights to the signals applied to individual antenna elements to direct the antenna main lobe pattern and/or side lobes and/or nulls towards specific azimuth and/or elevation angles. The use of specific azimuths and/or elevation angles can be used to beneficially direct radiated energy and receive energy to/from locations of specific user devices, in preference to other locations. Opportunistically, then serving a plurality of devices (e.g., UEs 102.1-102.2), the radiation pattern used to serve independent devices can generate a high degree of orthogonality between the channels used to serve individual devices. This allows multiple devices to be served simultaneously, using spatial multiplexing to simultaneously direct radiated energy towards a first device using a first set of antenna weights and towards a second device using a second set of antenna weights.

The individual channels are sensed using a system that monitors channel state information from individual devices. Channel information sensed from a plurality of devices, such as UEs 102.1-102.2, can be used to optimally select which devices to serve at a particular instance out of the total available set of devices. In a time-division duplex (TDD) system, the reciprocity of channel state information between the down-link and the up-link permits channel state information to be derived by examining received signals in the up-link and apply the derived information in determining the optimum antenna weights for operation in the down-link. In the 5G new radio (NR) system, sounding reference signals (SRS) are transmitted by a 5G device (e.g., a particular UE) and used to monitor the uplink channel state.

Beamforming offers benefits for devices where channel state is known. This means channel state for devices in the connected state can be continually updated and the composite beam pattern adapted accordingly. The periodicity of updates is limited by the period of updates to channel state information. In a TDD system, this may be limited by opportunities of devices in the connected state to send uplink information. Still in other frequency division duplex (FDD) systems, this may be limited by the periodicity of sending specific measurement reports that report information pertaining to the downlink channel state.

In certain environments, there will be a high degree of temporal correlation between successive estimation of channel state. Example of such environments can include when serving slow moving devices operated by pedestrian users. Being able to detect that channel state information exhibits a high temporal correlation allows the composite beams to be constructed with a high degree of directivity. Such beams are known as fine beams, where the elevation and/or azimuth arc is reduced to focus on a specific location. In other environments, there may be a low degree of temporal correlation between successive estimation of channel state. Examples of such environments can include when serving fast moving devices operated in a vehicular environment. Being able to detect that channel state information exhibits a low temporal correlation allows the composite beam to be constructed with a lower degree of directivity. Such beams are known as coarse beams, where the elevation and/or azimuth arc is increased to focus on a generalized location.

Whereas beamforming offers benefit to devices in the connected state, mobile systems it is useful to be able to transition devices from the idle state into the connected state. As channel state information is unknown for devices in the idle state, various operations may be involved to assist in the idle state to connected state transitioning procedure. These operations can include using procedures that avoid the use of beamforming during the initial attachment procedure. Such a beam is referred to a broadcast beam, where the elevation and/or azimuth arc is configured to cover the complete coverage area of a particular cell. Other operations include beam sweeping, where a coarse beam is swept across the entire elevation and/or azimuth arc that corresponds to the complete coverage area of a cell in discrete steps with devices configured to repeat their initial access procedures to ensure that a procedure will coincide with coverage of any device in the idle state in any location across a cell coverage area.

During initial attachment procedures, devices such as UEs 102 can make use of special signals transmitted in the downlink including the synchronization signal block (SSB) that includes the primary synchronization signal (PSS), the secondary synchronization signal (SSS), and the Channel State Information Reference Symbols (CSI-RS).

In a disaggregated radio access network, such as vRAN 120, beamformer logic is configured for each of RU 130.1.1, 130.1.2, and 130.1.3 and channel state information is determined during demodulation at the DU 132.1. Similarly, beamformer logic is configured for each of RU 130.2.1, 130.2.2, and 130.2.3 and channel state information is determined during demodulation at the DU 132.1. It is to be understood that any RUs as discussed herein may be configured with beamformer logic. The operation of the fronthaul network between the DU 132.1 and each of RU 130.1.1, 130.1.1, and 130.1.3 and also between the DU 132.2 and each of RU 130.2.1, 130.2.2, and 130.2.3 can be used to signal the information to enable the beamformer logic configured for each RU to configure appropriate beam weights.

In one embodiment, the fronthaul interface between DU 132.1 and each of RU 130.1.1, 130.1.2, and 130.1.3 and between DU 132.2 and each of RU 130.2.1, 130.2.2, and 130.2.3 may be based on the Open RAN (O-RAN) Alliance open fronthaul specification, such as O-RAN.WG4.CUS.0-v05.00, published Nov. 7, 2020. In such an embodiment, upper PHY functionality in each DU 132.1 and DU 132.2 may include the modulation/demodulation, scrambling/descrambling and channel encoding/decoding functionality, with the remainder of the physical layer functions, sometimes referred to as the lower physical layer, implemented in each of RU 130.1.1, 130.1.2, 130.1.3, 130.2.1, 130.2.2, and 130.2.3. In an open fronthaul implementation, frequency domain in-phase and quadrature information is signaled between the DU 132.1 and each of RU 130.1.1, 130.1.2, and 130.1.3 and between the DU 132.2 and each of RU 130.2.1, 130.2.2, and 130.2.3.

In order to support beamforming, the open fronthaul system may support various beamforming techniques. In one embodiment, pre-defined beams can be defined in each respective RU 130.1.1, 130.1.2, and 130.1.3 and DU 132.1 for each respective unique cell 136.1.1, 136.1.2, and 136.1.3 and also defined in each respective RU 130.2.1, 130.2.2, and 130.2.3 and DU 132.2 for each respective unique cell 136.2.1, 136.2.2, and 136.2.3. Each beam may represent a set of weights and phases applied to the set of antenna elements for each RU and can be represented by a 15-bit beam identifier (beam-ID) in which a beam-ID of zero (0) may correspond to a broadcast beam and other beam-IDs may correspond to predefined antenna patterns. The information that defines the spatial relations between different non-broadcast beam-IDs can be signaled between each of RU 130.1.1, 130.1.2, and 130.1.3 and DU 132.1 and between each of RU 130.2.1, 130.2.2, and 130.2.3 and DU 132.2. In various embodiments, the information can include whether a beam-ID corresponds to a coarse beam or a fine beam, identification of specific neighboring beam-IDs, and/or identification of any overlapping beam-IDs.

During operation, beam-IDs for each of unique cells 136.1.1, 136.1.2, and 136.1.3 can be signaled in messages sent between the DU 132.1 and each respective RU 130.1.1, 130.1.2, and 130.1.3 pertaining to each respective unique cell 136.1.1, 136.1.2, and 136.1.3. These operations can also be performed between DU 132.2 an each respective RU 130.2.1, 130.2.2, and 130.2.3 pertaining to each respective unique cell 136.2.1, 136.2.2, and 136.2.3. In the downlink, for example, a beam-ID for a unique cell can be signaled along with frequency domain in-phase and quadrature symbols to a given RU and can be used by the given RU to configure antenna weights when transmitting the corresponding symbols to a given UE 102.1 and/or 102.2 operating in a unique cell operating mode for a particular application traffic flow. In the uplink, a beam-ID for a unique cell can be signaled in control plane messages that configure the lower physical layer and can be received by a given RU and used to configure the antenna weights when receiving the corresponding symbols from uplink transmissions obtained from a given UE 102.1 and/or 102.2 operating in a unique cell operating mode for a particular application traffic flow.

In a shared cell, such as shared cell 138.1, frequency domain in-phase and quadrature symbols can be signaled to each of RUs 130.1.1, 130.1.2, and 130.1.3 which can then simultaneously transmit the same information. In the uplink for shared cell 138.1, common control plane messages are sent to each RU 130.1.1, 130.1.2, and 130.1.3 to configure the lower physical layer to simultaneously receive a set of symbols and signal such symbols to DU 132.1. Thus, it is to be understood that if a beam-ID of zero (0) is used in the signaling, then each of the plurality of RUs 130.1.1, 130.1.2, and 130.1.3 will use their corresponding broadcast beams for the operation of the shared cell 138.1. As an optimization in at least one embodiment, the beam space corresponding to a 15-bit beam-ID can be partitioned between individual RUs 130.1.1, 130.1.2, and 130.1.3. In such an embodiment, the beamforming RUs 130.1.1, 130.1.2, and 130.1.3 can effectively be operated as a single distributed multi-antenna system. Similar operations can also be performed via RUs 130.2.1, 130.2.2, and 130.2.3 via DU 132.2 for shared cell 138.2.

In contrast to a single RU system in which an RU is able to signal a DU information regarding the relationships between beam-IDs, in a distributed system as provided via vRAN 120 such information may be determined based on the spatial relationships between RU 130.1.1, 130.1.2, and 130.1.3 for shared cell 138.1 and between RU 130.2.1, 130.2.2, and 130.2.3 for shared cell 138.2 and, hence, may not be known a priori by an RU. Rather, the DU 132.1 can use frequency domain in-phase and quadrature symbols received from the RUs 130.1.1, 130.1.2, and 130.1.3 to determine the effective beam relations for shared cell 138.1 and the DU 132.2 can use frequency domain in-phase and quadrature symbols received from the RUs 130.2.1, 130.2.2, and 130.2.3 to determine the effective beam relations for shared cell 138.2.

In one embodiment, the DU 132.1 can signal the individual RUs 130.1.1, 130.1.2, and 130.1.3 with information of which beam-ID may be used for an additional broadcast beam. For example, DU 132.1 may configure the RU 130.1.1 to use a beam-ID 1 as an additional broadcast beam, may configure the RU 130.1.2 to use a beam-ID 2 as an additional broadcast beam, and may configure the RU 130.1.3 to use beam-ID 3 as an additional broadcast beam. On initialization, DU 132.1 may not know the relations between beam-ID 1, beam-ID 2 and beam-ID 3. Similar operations can be performed via DU 132.2, RU 130.2.1, 130.2.2, and 130.2.3 regarding shared cell 138.2.

Consider an example involving UE 102.1, which may initially be connected via shared cell 138.1. When serving UE 102.1 operating in a shared cell operating mode the DU 132.1 can configure beam-ID 1, beam-ID 2 and beam-ID 3 to simultaneously serve the uplink reception from a particular UE and DU 132.1 can receive corresponding frequency domain in-phase and quadrature symbols from RU 130.1.1, 130.1.2, 130.1.3. By processing these signals, DU 132.1 can determine the signal quality of the symbols received by the different RUs 130.1.1, 130.1.2, and 130.1.3 for uplink transmissions by UE 102.1. For example, this processing can indicate that while RU 130.1.3 may receive the best quality signal from the UE 102.1, RU 130.1.2 may receive the second best quality. The DU 132.1 can therefore determine that there is a spatial beam relationship between beam-ID 3 on RU 130.1.3 and beam-ID 2 on RU 130.1.2.

After such a period of determination, DU 132.1 can flexibly configure the RUs 130.1.1, 130.1.2, and 130.1.3 to operate in a range of configurations. Using beam-ID 0, for example, the DU 132.1 can operate using shared cell 138.1 where all RUs 130.1.1, 130.1.2, and 130.1.3 are used to simultaneously to serve UE 102.1 operating in the shared cell operating mode. In another example, using beam-ID 1, beam-ID 2, or beam-ID 3, the DU 132.1 can operate using a broadcast from a particular RU to serve UE 102.1 operating in the shared cell operating mode. In yet another example, using a combination of beam-ID 1 and beam-ID 2, using a combination of beam-ID 1 and beam-ID 3, or using a combination of beam-ID 2 and beam-ID 3, the DU 132.1 can operate using a distributed beamforming system from a plurality of RU 130.1.1, 130.1.2, and/or 130.1.3 to serve UE 102.1 operating in the shared cell operating mode.

Accordingly, multiple shared cells 138.1 and 138.2 can be present in system 100. The size and shape of the cells illustrated in FIG. 1 are provided for illustrative purposes only and are not meant to limit the broad scope of the embodiments discussed herein. Any size/shape of cell can be envisioned within the scope of embodiments discussed herein.

Further, although UEs 102.1 and 102.2 are illustrated in FIG. 1 as being outside the coverage areas of the cells with which they are/can be connected, such illustration is provided for illustrative purposes only in order to discuss various feature of embodiments herein. It is to be understood that UEs 102.1 and 102.2 are/can be located within coverage areas of the cells with which they are connected as discussed for various embodiments herein.

It is to be understood that the vRAN 120 configuration as shown in FIG. 1 is provided for illustrative purposes only and is not meant to limit the broad scope of the present disclosure. In some instances, a CU can interface with multiple DUs and/or an RU can interface with multiple DUs.

During operation, RAN-EMS 104 can provide the hybrid cell configuration for vRAN 120 in order to enable operating mode and resource information for shared cell 138.1 and unique cells 136.1.1, 136.1.2, and 136.1.3. For example, DU 132.1 can be configured via RAN-EMS 104 to operate in two operating modes (shared cell and unique cell operating modes) concurrently, each RU 130.1.1, 130.1.2, and 130.1.3 that DU 132.1 serves can be configured to operate concurrently in a shared cell mode and a unique cell mode to provide both a unique cell and the shared cell, and a frequency allocation along with cell ID (e.g., E-CGI/NR-CGI) and PCI (e.g., E-PCI/NR-PCI) can be provided between both modes.

Further, processing element endpoint configuration information can be provided for each RU-DU pairing. In various embodiments, a processing element endpoint configuration, depending on the transport type/network connectivity (e.g., Ethernet, IP, etc.) between DU 132.1 and each of RU 130.1.1, 130.1.2, and 130.1.3, may identify any of: different (alias) Media Access Control (MAC) addresses, virtual local area network (VLAN) identity and MAC addresses; and/or User Datagram Protocol (UDP) ports and IP addresses for the DU to which each RU is assigned. A particular processing element endpoint definition configured for a given RU/DU assignment can be provided a 'name' or other identifier that can be used by other systems, nodes, etc. (e.g., RAN-EMS 104) in order to tie UE flows to DU 132.1.

For example, RAN-EMS 104 can communicate to DU 132.1 the operating modes of the unique cell 136.1.1 and the shared cell 138.1 to be operated by RU 130.1.1, the unique cell 136.1.2 and the shared cell 138.1 to be operated by RU 130.1.2, and the unique cell 136.1.2 and the shared cell 138.1 to be operated by RU 130.1.3, the frequency allocation along with cell ID (e.g., E-CGI/NR-CGI) and PCI (e.g., E-PCI/NR-PCI) for each cell, and pairing information for the processing element endpoint configuration for each of RU 130.1.1, 130.1.2, 130.1.3 and DU 132.1 for the RU 130.1.1-DU 132.1 pairing, the RU 130.1.2-DU 132.1 pairing, and the RU 130.1.3-DU 132.1 pairing.

Thereafter, DU 132.1 can communicate the NR-CGI and NR-PCI information for each cell to be provided by RU 130.1.1, 130.1.2, and 130.1.3 along with the operating mode for each cell and the CU 134.1 can activate each cell for RU 130.1.1, 130.1.2, and 130.1.3 in the shared or unique operating mode based on the configuration. Similar operating modes, frequency configurations, and processing element endpoint configurations can also be provided for DU 132.2 and RUs 130.2.1, 130.2.2, and 130.2.3 via RAN-EMS 104.

A potential limitation of a shared cell is that its scope of operation is per-DU, such that all RUs connected to a given DU become part of the same shared cell. No handovers are involved as UE moves between the RUs connected to same DU. However, neighbor shared cells involving RUs connected to a different DU may be operating in different frequency. In this instance, as a given UE moves from the coverage area of a first RU operated by a first DU to the coverage area of a second RU operated by to a second DU, a handover for the UE results to handover the UE from the first RU to the second DU. However, as a result of the scope of a shared cell and the necessity of performing handover, a UE connected to a shared cell may result in a handover to unique cell or a UE connected to a unique cell may result in a handover to a shared cell as the target RU is operating in hybrid mode to provide both a shared cell and a unique cell.

Presented herein are techniques to address this gap by allowing the network to assist a UE during handover and allow it to handover to a cell that is operating in the same mode as the cell that the UE is connected to prior to the handover.

Each of CU 134.1 and CU 134.2 can include Automatic Neighbor Cell Relation (ANR) logic that facilitate building and managing a Neighbor Cell Relationship Table (NCRT). In one example during operation of system 100, a given CU (e.g., CU 134.1 or CU 134.2) operating a cell to which a given UE is currently attached can build an NCRT that indicates corresponding neighbor cells, along with their operating modes, that may be proximate to the cell to which the UE is currently attached. In one embodiment, a given CU can build the NCRT based on measurement information and reports provided by a UE for neighbor cells detected by the UE (e.g., via RF detection by the UE). In another embodiment, a given CU can build the NCRT based on an Xn-based exchange with one or more other CUs for a deployment.

In yet another embodiment involving beam resources, a given DU can build a new Automatic Neighbor RU relations table. In one example, the DU can use reported information from a UE related to optimum pre-coding index and uses the pre-coding configured for different RUs to generate a neighbor RU table, e.g., if a UE reports precoding matrix 12 as optimum and then reports precoding matrix 9 as optimum, the DU can build a relationship between the RUs that have been configured for precoding matrix 12 and 9.

Various techniques can be utilized by the CU to perform the handover for the UE. For example, for a first technique as discussed in further detail below with reference to FIGS. 2A and 2B and FIGS. 4A and 4B, the CU can provide the UE with RRC measurement control, which guides the UE with measurement event reporting when a neighbor cell signal strength (e.g., Reference Signal Received Power (RSRP) and/or Reference Signal Received Quality (RSRQ)) exceeds one or more reporting event threshold(s). In some instances, based on the cell type to which the UE is currently connected (e.g., shared cell or unique cell), the CU can configure the UE to only report measurements for: i) neighbor cells that are operating only in a shared cell mode; or ii) neighbor cells that are operating only in a unique cell mode.

Thereafter for the first technique, the UE can send an RRC measurement report to the CU when one or more of threshold(s) are satisfied/exceeded and the CU can select a target cell for handover of the UE using the neighbor relationship table by identifying the target cell as being operated in the same operating mode as the cell to which the UE is currently attached (e.g., handover from a first shared cell operated by a first RU/DU/CU to a second shared cell operated by a second RU/DU/CU or handover from a first unique cell operated by a first RU/DU/CU to a second unique cell operated by a second RU/DU/CU).

A second technique, referred to herein as a 'conditional handover' technique as discussed below with reference to FIGS. 3A-3B, can involve the CU identifying, based on the neighbor relationship table, potential target cells for handover of the UE that are operating in the same operating mode as the cell to which the UE is currently attached requesting reservation of UE resources at the potential target cells. Upon determining successful reservation of resources at the potential target cells operating in the same operating mode, the CU can signal a conditional handover event to the UE identifying the potential target cells and the UE can select a particular target cell with which to perform the handover. Following successful handover of the UE to the particular target cell, the CU can cancel the resource reservations at the other potential target cells.

Figure 2A:
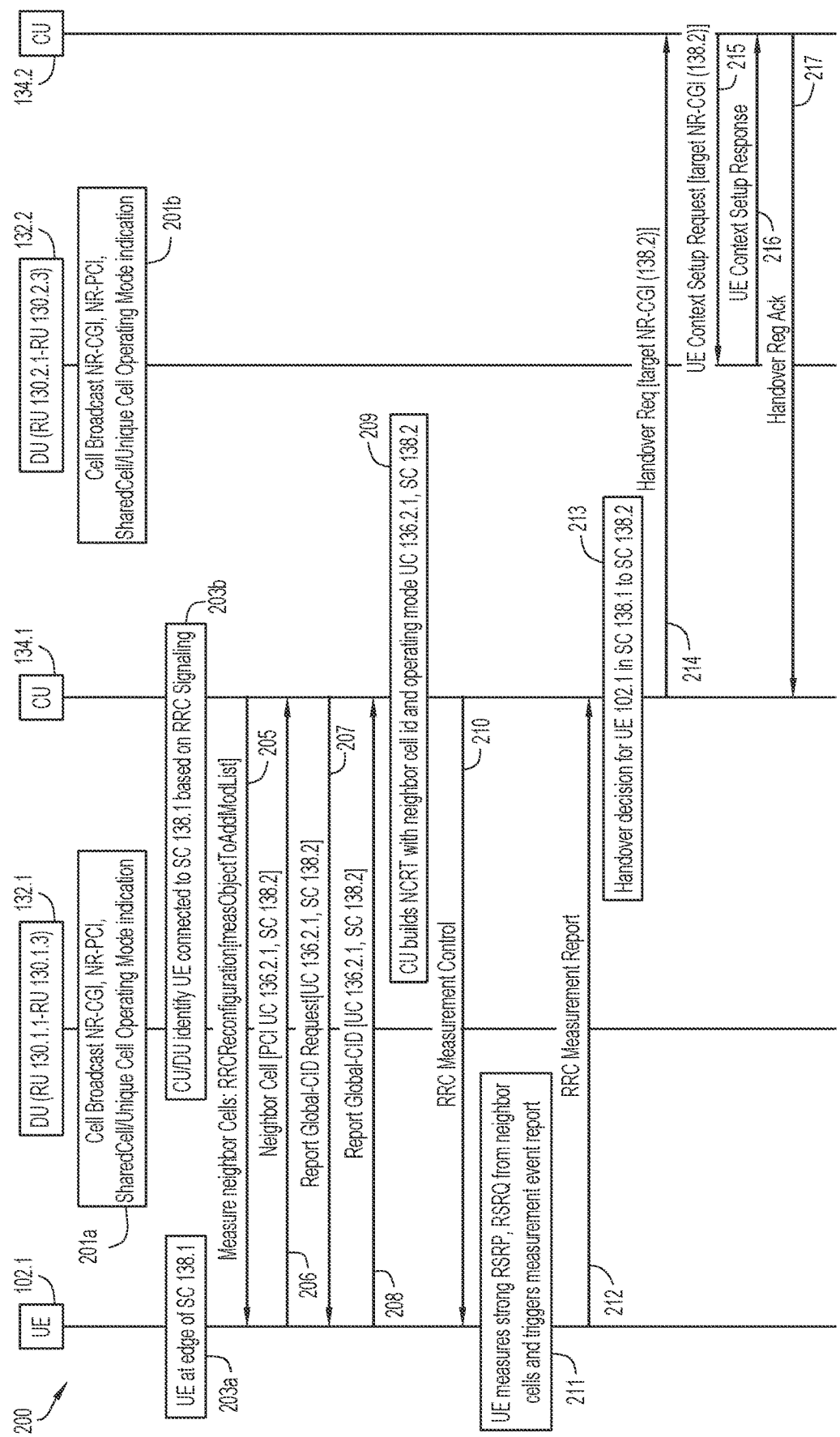
FIGS. 2A and 2B are a message sequence diagram illustrating a call flow associated with supporting handovers in a hybrid cell configuration environment, according to an example embodiment.
Figure 2B:
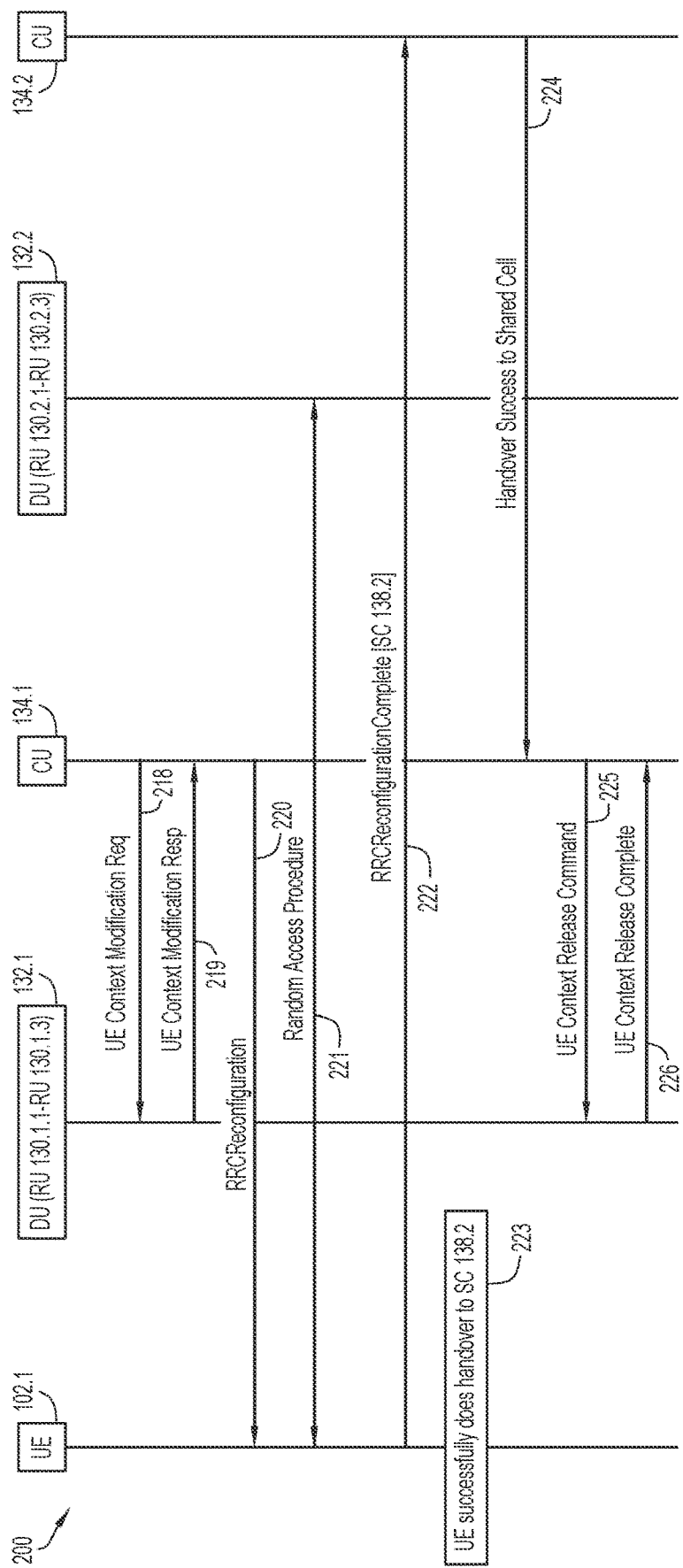

With reference to FIGS. 2A and 2B, FIGS. 2A and 2B are a message sequence diagram illustrating a call flow 200 associated with supporting handovers in the hybrid cell configuration environment of vRAN 120 involving the first (UE-initiated) technique to facilitate dynamic switching. FIGS. 2A-2B include UE 102.1, DU 132.1, CU 134.1, DU 132.2 and CU 134.2. Each of RU 130.1.1-RU 130.1.3 are not illustrated in FIGS. 2A-2B for purposes of brevity only in order to discuss various features that may be provided by system 100 with reference to call flow 200 for the embodiment of FIGS. 2A-2B. It is to be understood that each RU 130.1.1, RU 130.1.2, and RU 130.1.3 interface with DU 132.1 and are operated by DU 132.1/CU 134.1 for various features discussed in connection with the call flow 200 of FIGS. 2A-2B. Further, each of RU 130.2.1-RU 130.2.3 are also not illustrated in FIGS. 2A-2B for purposes of brevity only in order to discuss various features that may be provided by system 100 with reference to call flow 200 for the embodiment of FIGS. 2A-2B. It is to be understood that each of RU 130.2.1, 130.2.2, and RU 130.2.3 interface with DU 132.2 and are operated by DU 132.2/CU 134.2 for various features discussed in connection with the call flow 200 of FIGS. 2A-2B.

For the embodiment of FIGS. 2A-2B, each of RU 130.1.1, 130.1.2, and 130.1.3 operated by DU 132.1/CU 134.1 are enhanced (following configuration performed via RAN-EMS 104, as discussed above) to broadcast their corresponding cell operating mode(s) as part of a first System Information Block (SIB1) broadcast for each cell, as shown at 201*a*. In one embodiment, an operating mode indicating a shared cell or a unique cell can be included as bit, byte, flag, Information Element (IE), or the like in a SIB1 broadcast. In one embodiment, each cell broadcast by each of RU 130.1.1, 130.1.2, and 130.1.3 operated by DU 132.1/CU 134.1 can include an NR-CGI, an NR-PCI, and a shared cell operating mode indication for shared cell (SC) 138.1 broadcasts and a unique cell operating mode indication for each cell/NR-CGI provided by each RU 130.1.1, 130.1.2, and 130.1.3 for each corresponding unique cell (UC) 136.1.1, 136.1.2, and 136.1.3 broadcast provided by each corresponding RU 130.1.1, 130.1.2, and 130.1.3. In another embodiment, a mode flag may be set in a SIB1 broadcast for indicating a shared cell configuration for a given cell, whereas absence of the mode flag or the mode flag being unset can be used to indicate a unique cell configuration for a given cell.

Similarly, each of RU 130.2.1, 130.2.2, and 130.2.3 operated by DU 132.2/CU 134.2 are enhanced to broadcast their corresponding cell operating mode(s) as part of a SIB1 broadcast for each cell, as shown at 201*b*. In one embodiment, each cell broadcast by each of RU 130.2.1, 130.2.2, and 130.2.3 operated by DU 132.2/CU 134.2 can include an NR-CGI, an NR-PCI, and a shared cell operating mode indication for shared cell (SC) 138.2 broadcasts and a unique cell operating mode indication for each cell/NR-CGI provided by each of RU 130.2.1, 130.2.2, and 130.2.3 for each corresponding unique cell (UC) 136.2.1, 136.2.2, and 136.2.3 broadcast provided by each corresponding RU 130.2.1, 130.2.2, and 130.2.3. In another embodiment, a mode flag may be set in a SIB1 broadcast for indicating a shared cell configuration for a given cell, whereas absence of the mode flag or the mode flag being unset can be used to indicate a unique cell configuration for a given cell.

For the embodiment of FIGS. 2A-2B, consider that UE 102.1 attaches/connects to the network (e.g., vRAN 120/mobile core network 110) via SC 138.1 at the edge of SC 138.1, as shown at 203*a*. As shown at 203*b*, the CU 134.1/DU 132.1 identify that UE 102.1 is connected to SC 138.1 based on RRC signaling with UE 102.1 for the connection.

After UE 102.1 attaches to network, CU 134.1 instructs the UE to perform measurements on neighbor cells, as shown at 205, in which the list of neighbor cells is identified via the measObjectToAddModList field within an RRC Reconfiguration message. As shown at 206, the UE sends CU 134.1 a measurement report regarding neighbor cells that it has measured. For the embodiment of FIGS. 2A-2B, consider that UE 102.1 sends a measurement report including the NR-PCI for UC 136.2.1 and the NR-PCI for SC 138.2, which may be proximate to the location of UE 102.1, as shown in FIG. 1. The NR-PCI for each neighbor cell is included in the measurement report but not the NR-CGI for each neighbor cell. Although NR-PCI is discussed for the present embodiment, 4G/LTE PCI can also be reported for implementations involving 4G/LTE cells.

When CU 134.1 receives the UE 102.1 measurement report containing the NR-PCI or an index that allows the measurement to be identified against an indexed list of requested measurements for each neighbor cell, the CU 134.1 instructs the UE 102.1 at 207, using the newly discovered NR-PCI for each neighbor cell as a parameter in the instruction, to read and report all the broadcast NR-CGI(s) (and/or ECGI(s) as appropriate), Tracking Area Code(s) (TAC(s)), RAN Area Code(s) (RANAC(s)), Public Land Mobile Network (PLMN) PLMN ID(s) and, for neighbor NR cells, NR frequency band(s). In some embodiments, the instruction at 206 may involve the CU 134.1 scheduling appropriate idle periods to allow the UE to read the NCGI/ECGI from the broadcast channel of a detected neighbor cell, as specified at least in 3GPP Technical Specification (TS) 38.300.

Further, the instruction at 207 instructs the UE 102.1 to report which neighbor cells are shared cell and which are unique cells based on the broadcast operating mode indication provided by each neighbor cell. Thus, at 208, UE 102.1 reports the corresponding NR-CGI, TAC, RANAC, PLMN ID, and frequency band(s) along with an operating mode indication for each of UC 136.2.1 and SC 138.2 detected by UE 102.1. In various embodiments, an operating mode indication can be indicated using any of a bit, byte, flag, IE, etc. in a measurement report.

As shown at 209, CU 134.1 uses the reported NR-CGI, operating mode type, etc. to create a Neighbor Cell Relation Table (NCRT). The Automatic Neighbor Cell Relation (ANR) function or logic resides in the CU 134.1 and manages the NCRT. An example NCRT is shown below in TABLE 1. As shown in TABLE 1, the NCRT table is enhanced to mark each neighbor NR-CGI with the operating mode (e.g., shared versus unique), which may be expressed in TABLE 1 using the format 'NR-CGI(ref num)' or 'NR-PCI(ref num)' based on the reference number of each cell, as shown in FIG. 1. It is to be understood that other information reported by UE 102.1 for each detected neighbor cell can also be included in the NCRT (e.g., TAC, RANAC, PLMN ID, etc.).

TABLE 1

Example NCRT with Operating Mode Indication

| CGI | PCI | Operating Mode |
|---|---|---|
| NR-CGI (138.2) | NR-PCI(138.2) | Shared |
| NR-CGI(136.2.1) | NR-PCI(136.2.1) | Unique |

At 210, CU 134.1 provides UE 102.1 with RRC Measurement Control signaling, which guides the UE with measurement event reporting when neighbor cell signal strength (e.g., RSRP, RSRQ, etc.) exceeds one or more threshold(s), as can be indicated using various reporting events, such as A3, A4, A5, etc. reporting events), which can be used to cause handover of the UE to a neighbor cell.

Generally, the 'A3' threshold represents a reporting event threshold that can be used to trigger measurement reporting by a UE for a handover scenario in which a neighbor cell has a signal strength offset that is measured by the UE to be better than the primary cell currently serving the UE. Generally, the 'A4' threshold represents a reporting event threshold that can be used to trigger measurement reporting by a UE for a handover scenario in which a neighbor cell has a signal strength that is measured by the UE to be better than a particular threshold. Generally, the 'A5' threshold represents a reporting event threshold that can be used to trigger measurement reporting by a UE for a handover scenario in which the primary cell serving the UE has a signal strength as measured by the UE that becomes worse than a first threshold (T1) and a neighbor cell signal strength as measured by the UE becomes better than a second threshold (T2). Other thresholds can be configured per 3GPP standards as prescribed, for example, by 3GPP TS 38.331. For example, an 'A2' threshold represents a reporting event threshold that can be used to trigger measurement reporting by a UE for a handover scenario in which the serving cell for the UE becomes worse than a particular threshold.

In at least one embodiment, the operations at 210 can be enhanced such that the UE 102.1 is configured to only report measurements for: i) neighbor cells that are shared only; or ii) neighbor cells that are unique only, based on the cell type to which the UE is currently connected. For example, for the embodiment of FIGS. 2A-2B, CU 134.1 could instruct UE 102.1 to only report measurements for neighbor cells that are shared cells since UE 102.1 is attached to the network via SC 138.1.

As shown at 211, consider that mobility of UE 102.1 that moves the UE closer to the neighbor cells operated by CU 134.2/DU 132.2 (as generally illustrated via the dashed-line arrow for UE 102.1 shown in FIG. 1) such that UE 102.1 measures strong signal strength (e.g., RSRP and/or RSRQ) from the neighbor cells, which triggers a measurement event report to be sent by the UE 102.1 to CU 134.1 at 212 when the signal strength exceeds at least one of the reporting even threshold(s).

As UE 102.1 is currently attached to the network via SC 138.1, at 213, CU 134.1 performs a lookup on the NCRT (as shown in TABLE 1, for example) to identify and select a target cell for handover of the UE that is operating in the same operating mode as the shared cell through which UE 102.1 is currently attached/connected to the network. Thus, CU 134.1 selects SC 138.2 (as opposed to UC 136.2.1) as the target cell (e.g., target NR-CGI(138.2)) for the handover of UE 102.1 and a handover procedure is triggered between CU 134.1 and CU 134.2 (and DU 132.2), as shown at 214. The remaining operations at 215, 216, 217, 218, 219, 220, 221, and 222 may be performed according to 3GPP standards, as prescribed at least by 3GPP TS 38.300, to facilitate the successful handover of UE 102.1 to SC 138.2, as shown at 223 of FIG. 2B, which triggers CU 134.2 to indicate a handover success to CU 134.1 at 224. Thereafter, CU 134.1 performs a standards-based UE context release with DU 132.1 to complete the handover process, as shown at 225 and 226.

Figure 4A:
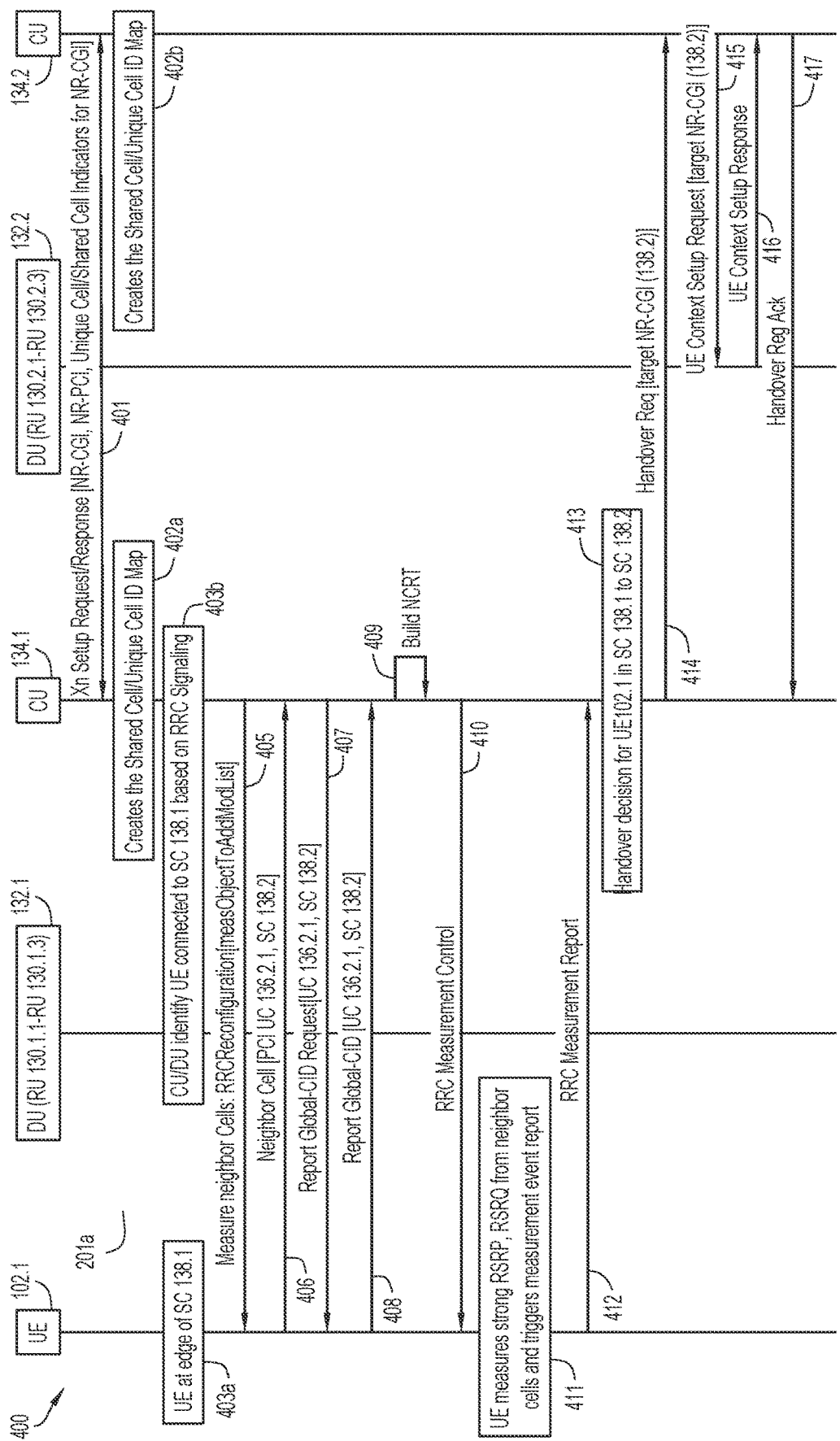
FIGS. 4A and 4B are a message sequence diagram illustrating another call flow associated with supporting handovers in a hybrid cell configuration environment, according to an example embodiment.
Figure 4B:
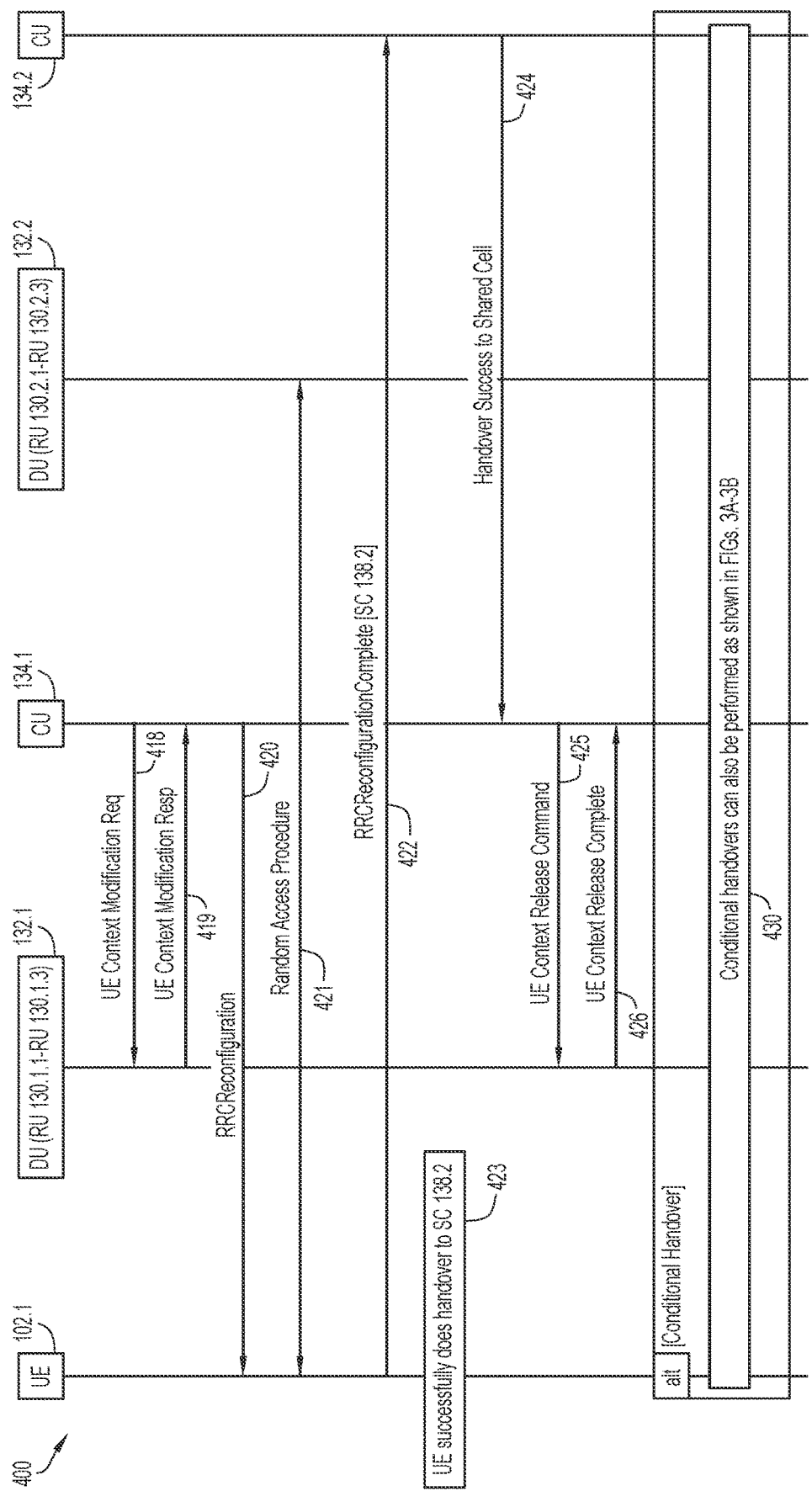

Thus, as shown in FIGS. 2A-2B, system 100 can support handovers in the hybrid cell configuration environment of vRAN 120 through RRC measurement control provided to UE 102.1 for one or more reporting event(s). FIGS. 4A-4B, discussed in further detail below, illustrates another embodiment through which system 100 can support handovers in the hybrid cell configuration of vRAN 120 through RRC measurement control; however, the embodiment of FIGS. 4A-4B involves an Xn exchange between CU 134.1 and CU 134.2 to facilitate creation of a cell map for each CU that identifies both the cells operated by each CU/DU as well as corresponding neighboring cells along with their corresponding operating modes rather than each cell broadcasting its corresponding operating mode, as discussed for the embodiment of FIGS. 2A-2B.

Figure 3A:
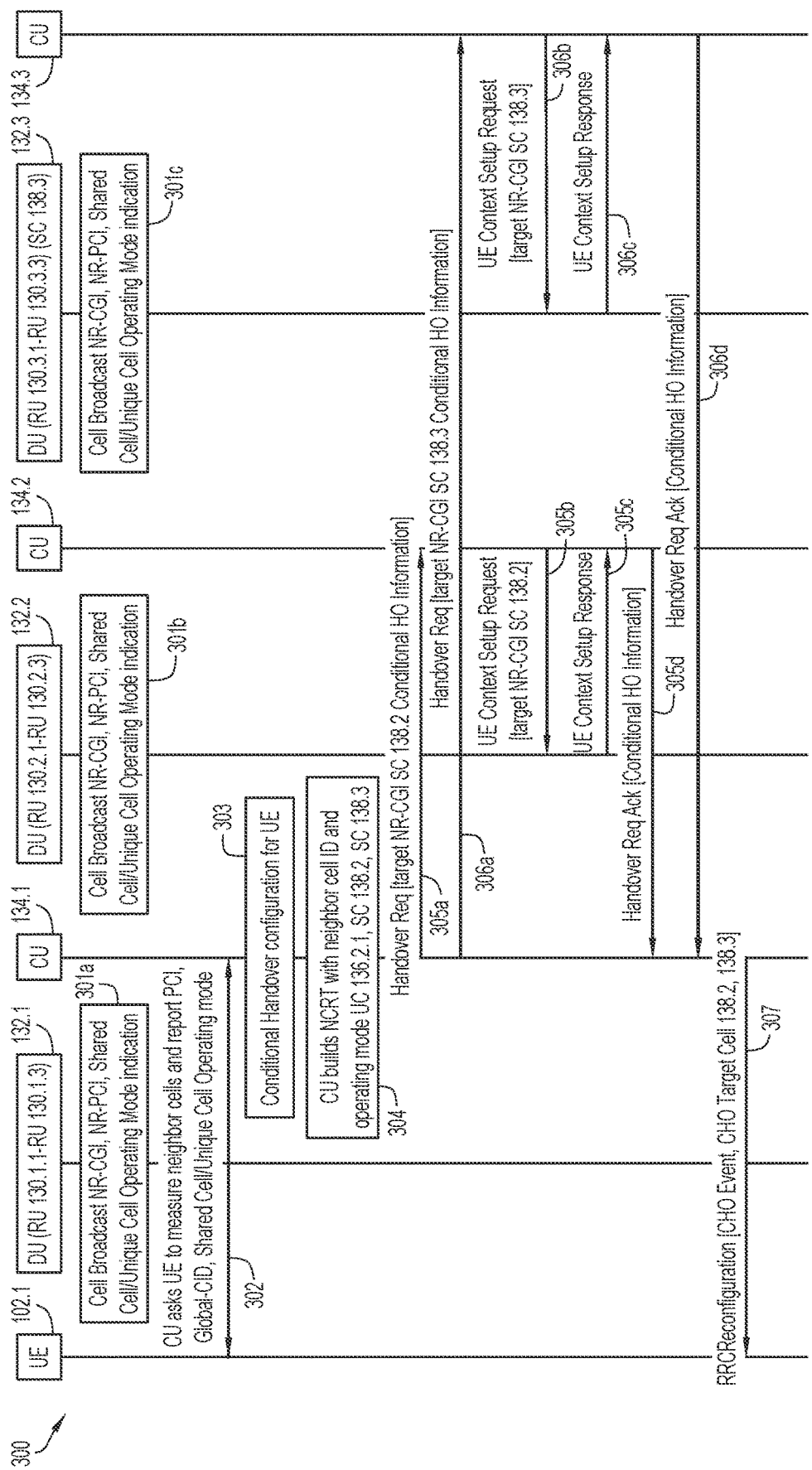
FIGS. 3A and 3B are a message sequence diagram illustrating another call flow associated with supporting handovers in a hybrid cell configuration environment, according to an example embodiment.
Figure 3B:
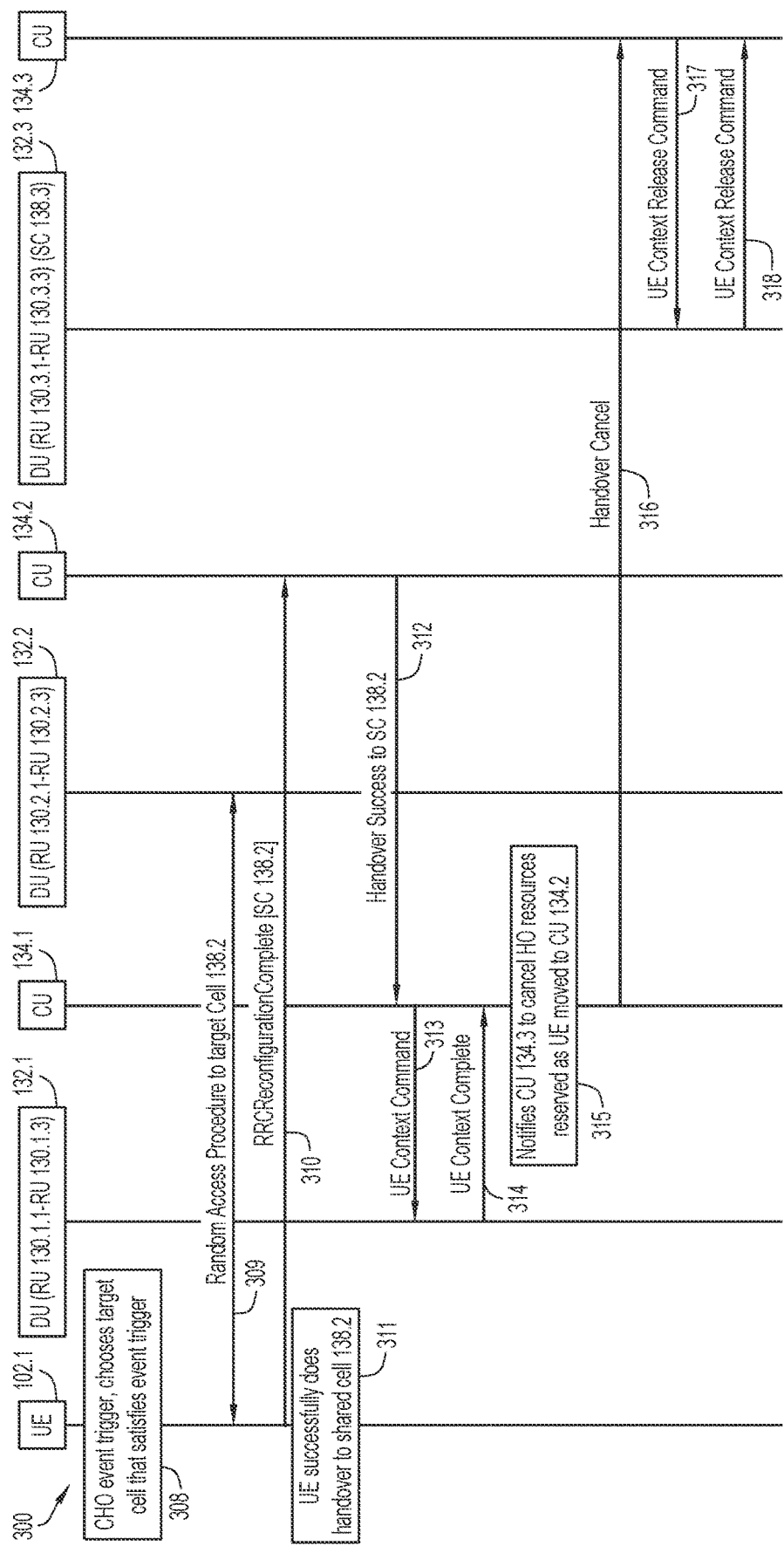

Turning to FIGS. 3A-3B, FIGS. 3A-3B are a message sequence diagram illustrating a call flow 300 involving the conditional handover (CHO) technique for supporting handovers in the hybrid cell configuration environment of vRAN 120. FIGS. 3A-3B include UE 102.1, DU 132.1, CU 134.1, DU 132.2, and CU 134.2. Also shown in FIGS. 3A-3B are additional vRAN components for an additional set of neighboring cells that may be implemented in system 100 (although not shown in FIG. 1) in which the additional neighboring cells can be provided by each of an additional RU 130.3.1, RU 130.3.2, and RU 130.3.3 that can be operated by an additional DU 132.3/CU 134.3 in which the neighboring cells can include another shared cell (SC) 138.3 and other unique cells (UCs) 136.3.1, 136.3.2, and 136.3.3 provided by each of RU 130.3.1, RU 130.3.2, and RU 130.3.3.

Similar to the embodiment of FIGS. 2A-2B, each of RU 130.1.1-RU 130.1.3 are not illustrated in FIGS. 3A-3B for purposes of brevity only in order to discuss various features that may be provided by system 100 with reference to call flow 300 for the embodiment of FIGS. 3A-3B. It is to be understood that each RU 130.1.1, RU 130.1.2, and RU 130.1.3 interface with DU 132.1 and are operated by DU 132.1/CU 134.1 for various features discussed in connection with the call flow 300 of FIGS. 3A-3B. Further, each of RU 130.2.1-RU 130.2.3 are also not illustrated in FIGS. 3A-3B for purposes of brevity only in order to discuss various features that may be provided by system 100 with reference to call flow 300 for the embodiment of FIGS. 3A-3B. It is to be understood that each of RU 130.2.1, 130.2.2, and RU 130.2.3 interface with DU 132.2 and are operated by DU 132.2/CU 134.2 for various features discussed in connection with the call flow 300 of FIGS. 3A-3B. Further, each of RU 130.3.1-RU 130.3.3 are also not illustrated in FIGS. 3A-3B for purposes of brevity only in order to discuss various features that may be provided by system 100 with reference to call flow 300 for the embodiment of FIGS. 3A-3B. It is to be understood that each of RU 130.3.1, 130.3.2, and RU 130.3.3 can interface with DU 132.3 and can be operated by DU 132.3/CU 134.3 for various features discussed in connection with the call flow 300 of FIGS. 3A-3B.

For the embodiment of FIGS. 3A-3B, each of RU 130.1.1, 130.1.2, and 130.1.3 operated by DU 132.1/CU 134.1 are enhanced to broadcast their corresponding cell operating mode as part of a SIB1 broadcast for each cell, as shown at 301*a*. Similarly, each of RU 130.2.1, 130.2.2, and 130.2.3 operated by DU 132.2/CU 134.2 are enhanced to broadcast their corresponding cell operating mode as part of a SIB1 broadcast for each cell, as shown at 301*b*, and each of RU 130.3.1, 130.3.2, and 130.3.3 operated by DU 132.3/CU 134.3 are enhanced to broadcast their corresponding cell operating mode as part of a SIB1 broadcast for each cell, as shown at 301*c*.

For the embodiment of FIGS. 3A-3B, consider that UE 102.1 attaches/connects to the network (e.g., vRAN 120/ mobile core network 110) via SC 138.1 at the edge of SC 138.1 and the CU 134.1/DU 132.1 identify that UE 102.1 is connected to SC 138.1 based on RRC signaling with UE 102.1 for the connection.

Operations at 302 involving UE 102.1 and CU 134.1 can be performed similar to those discussed above at 205, 206, 207, and 208 in which CU 134.1 instructs the UE 102.1 to perform and report measurements on neighbor cells and also instructs the UE 102.1 to read and report the broadcast information for the neighbor cells, including the operating mode of each neighbor cell. For the embodiment of FIGS. 3A-3B, consider that UE 102.1 reports measurements and broadcast information for UC 136.2.1, SC 138.2, and SC 138.3 at 302.

For the embodiment of FIGS. 3A-3B, consider that CU 134.1 includes a conditional handover configuration for UE 102.1, as shown at 303. At 304, CU 134.1 builds a NCRT including, at least in part, neighbor cell ID and operating mode information for UC 136.2.1, SC 138.2, and SC 138.3.

For the conditional handover process, CU 134.1 performs a resource reservation process with each CU operating one or more neighbor cells identified in the NCRT that are of a same operating mode as the cell to which the UE 102.1 is currently connected; SC 138.1 in the embodiment of FIGS. 3A-3B. For example, a resource reservation process is performed between CU 134.1 and CU 134.2 at 305*a*, 305*b*, 305*c*, and 305*d* regarding SC 138.2 as a potential handover target for UE 102.1 in which CU 134.1 communicates a handover request (Handover Req) at 305*a* to CU 134.2 identifying a conditional handover involving SC 138.2 as a potential handover target. At 305*b*, CU 134.2 attempts a context setup with DU 132.2 to reserve resources for UE 102.1 at SC 138.2. Based on a successful context setup for the resources, as shown at 305*c*, CU 134.2 communicates an acknowledgment to CU 134.1, as shown at 305*d* (e.g., Handover Req ACK), indicating a successful reservation of resources for potential handover of UE 102.1 to potential target cell SC 138.2. A similar resource reservation process is performed by CU 134.1 with CU 134.3 at 306*a*, 306*b*, 306*c*, and 306*d* regarding SC 138.2 as a potential handover target for UE 102.1.

Upon CU 134.1 obtaining the acknowledgement of successful resource reservations for potential handover targets SC 138.2 (as shown at 305*d*) and SC 138.2 (as shown at 306*d*), CU 134.1 communicates an RRC Reconfiguration message to UE 102.1 at 307 indicating conditional handover (CHO) event information/triggers that can cause handover for the UE 102.1 and further identifies the candidate list of potential target cells, SC 138.2 and SC 138.2, with which UE 102.1 may perform a handover. In general, the source CU 134.1 can build a CHO command, which is an RRC Reconfiguration message that can include a list of reconfiguration options as well as RRC measurement configurations/events that can enable the UE 102.1 to determine a possible target cell that is the best fit based on the command. At 308 as shown in FIG. 3B, UE 102.1 selects one of the potential target cells for handover that satisfies a CHO event trigger. Thus, the UE 102.1 can monitor radio signal quality and select a best neighbor from the candidate list.

Consider for the embodiment of FIGS. 3A-3B that UE 102.1 selects SC 138.2 for performing the handover and performs handover operations to complete the handover with SC 138.2, as shown at 309 and 310, which results in a successful handover to SC 138.2, as shown at 311.

At 312, CU 134.2 communicates a handover success indication to CU 134.2, which triggers CU 134.1 to command DU 132.1 to release the UE 102.1 context, as shown at 313 and 314. At 315 and 316, CU 134.1 notifies CU 134.3 to cancel the handover resources reserved for SC 138.3 as UE has completed the handover to SC 138.2. At 317 and 318, CU 134.3 releases the UE 102.1 context via DU 132.3.

Thus, as shown in FIGS. 3A-3B, system 100 can support handovers in the hybrid cell configuration environment of vRAN 120 utilizing conditional handover mechanisms in some embodiments.

Referring to FIGS. 4A-4B, FIGS. 4A and 4B are a message sequence diagram illustrating a call flow 400 including UE 102.1, DU 132.1, CU 134.1, DU 132.2, and CU 134.2 involving a variation of the first technique for supporting handovers through RRC measurement control provided to a UE, as discussed above with reference call flow 200 shown in FIGS. 2A-2B.

Each of RU 130.1.1-RU 130.1.3 are not illustrated in FIGS. 4A-4B for purposes of brevity only in order to discuss various features that may be provided by system 100 with reference to call flow 400 for the embodiment of FIGS. 4A-4B. It is to be understood that each RU 130.1.1, RU 130.1.2, and RU 130.1.3 interface with DU 132.1 and are operated by DU 132.1/CU 134.1 for various features discussed in connection with the call flow 400 of FIGS. 4A-4B. Further, each of RU 130.2.1-RU 130.2.3 are also not illustrated in FIGS. 4A-4B for purposes of brevity only in order to discuss various features that may be provided by system 100 with reference to call flow 400 for the embodiment of FIGS. 4A-4B. It is to be understood that each of RU 130.2.1, 130.2.2, and RU 130.2.3 interface with DU 132.2 and are operated by DU 132.2/CU 134.2 for various features discussed in connection with the call flow 400 of FIGS. 4A-4B.

Recall, for the embodiment of FIGS. 2A-2B that each cell can broadcasts their corresponding operating mode(s) (e.g., as discussed at 201*a* and 201*b* of FIG. 2A) in at least one embodiment. However, for the variation of the first technique illustrated for the embodiment of FIGS. 4A-4B, each of RU 130.1.1, 130.1.2, and 130.1.3 operated by DU 132.1/ CU 134.1 do not broadcast their corresponding cell operating mode(s) and RU 130.2.1, 130.2.2, and 130.2.3 operated by DU 132.2/CU 134.2 do not broadcast their corresponding cell operating mode(s).

Rather, the embodiment of FIGS. 4A-4B involves an Xn Setup Request is enhanced to exchange neighboring cell information between CU 134.1 and CU 134.2, as shown at 401, which can be used facilitate creation of a cell map by each of CU 134.1 (as shown at 402*a*) and CU 134.2 (as shown at 402*b*) that identifies the cell IDs (NR-CGI and, in some instances, also NR-PCI) both for cells operated by each CU/DU as well as neighboring cells for each CU along with their corresponding operating modes.

In one embodiment, the Xn exchange at 401 can involve a request/response exchange in which each CU 134.1, 134.2 requests neighboring cell information from the other CU, which responds with the cell information and triggers each CU to build a cell map based, at least in part, on the obtained neighboring cell information.

For example, the cell map for CU 134.1 can identify cells operated by CU 134.1/DU 132.1 (e.g., SC 138.1, UC 136.1.1, UC 136.1.2, and UC 136.1.3) as well as neighboring cells SC 138.2 and UC 136.2.1, UC 136.2.2, and UC 136.2.2 along with their corresponding operating modes. Similarly, the cell map for CU 134.2 can identify cells operated by CU 134.2/DU 132.2 (e.g., SC 138.2, UC 136.2.1, UC 136.2.2, and UC 136.2.3) as well as neighboring cells SC 138.1 and UC 136.1.1, UC 136.1.2, and UC 136.1.3 along with their corresponding operating modes. In one embodiment, an indication of an operating mode corresponding to a shared cell or a unique cell could be indicated through the Xn exchange via a bit in the NR-CGI (or ECGI, if applicable) identifier (e.g., most significant bit) that indicates whether the NR-CGI/ECGI is a shared cell or a unique cell.

TABLEs 2 and 3, below, illustrates a neighboring cell map configuration that may be built by each of CU 134.1 (TABLE 2) and CU 134.2 (TABLE 3) based on the Xn exchange at 401 in one embodiment. In one instance, each cell can be identified using their corresponding NR-CGI/ECGI, as applicable, which may be expressed in TABLEs 2 and 3 using the format 'NR-CGI(ref num)' based on the reference number of each cell, as shown in FIG. 1.

TABLE 2

Example Cell Map for CU 134.1

| Operating Mode | DU 132.1 | CU 134.2 |
|---|---|---|
| Shared Cell | NR-CGI(138.1) | NR-CGI(138.2) |
| Unique Cell | NR-CGI(136.1.1), NR-CGI(136.1.2), NR-CGI(136.1.3) | NR-CGI(136.2.1), NR-CGI(136.2.2), NR-CGI(136.2.3) |

TABLE 3

Example Cell Map for CU 134.2

| Operating Mode | DU 132.2 | CU 134.1 |
|---|---|---|
| Shared Cell | NR-CGI(138.2) | NR-CGI(138.1) |
| Unique Cell | NR-CGI(136.2.1), NR-CGI(136.2.2), NR-CGI(136.2.3) | NR-CGI(136.1.1), NR-CGI(136.1.2), NR-CGI(136.1.3) |

For the embodiment of FIGS. 4A-4B, consider that UE 102.1 attaches/connects to the network (e.g., vRAN 120/mobile core network 110) via SC 138.1 at the edge of SC 138.1, as shown at 403*a*. As shown at 403*b*, the CU 134.1/DU 132.1 identify that UE 102.1 is connected to SC 138.1 based on RRC signaling with UE 102.1 for the connection.

After UE 102.1 attaches to network, CU 134.1 instructs the UE to perform measurements on neighbor cells, as shown at 405. As shown at 406, the UE 102.1 sends CU 134.1 a measurement report regarding neighbor cells that it has measured. For the embodiment, of FIGS. 4A-4B, consider that UE 102.1 sends a measurement report including the NR-PCI for UC 136.2.1 and the NR-PCI for SC 138.2, which may be proximate to the location of UE 102.1, as shown in FIG. 1. The NR-PCI for each neighbor cell is included in the measurement report but not the NR-CGI for each neighbor cell. Although NR-PCI is discussed for the present embodiment, 4G/LTE PCI can also be reported for implementations involving 4G/LTE cells.

At 407, the CU 134.1 instructs the UE 102.1 using the newly discovered NR-PCI for each neighbor cell as a parameter in the instruction, to read and report all the broadcast NR-CGI(s) (and/or ECGI(s) as appropriate), Tracking Area Code(s) (TAC(s)), RAN Area Code(s) (RANAC(s)), Public Land Mobile Network (PLMN) PLMN ID(s) and, for neighbor NR cells, NR frequency band(s). In some embodiments, the instruction at 406 may involve the CU 134.1 scheduling appropriate idle periods to allow the UE to read the NCGI/ECGI from the broadcast channel of a detected neighbor cell.

As the operating mode(s) are not broadcast for the cells for the embodiment of FIGS. 4A-4B, UE 102.1 is not instructed to report the operating mode(s) of the cells. Rather, at 408 UE 102.1 reports the corresponding NR-CGI, TAC, RANAC, PLMN ID, and frequency band(s) for each of UC 136.2.1 and SC 138.2 detected by UE 102.1 and, at 409, CU 134.1 builds the NCRT in which the table is enhanced to identify each neighbor NR-CGI with its corresponding operating mode (shared or unique) based on the operating mode information obtained from Xn Setup Request/Response for each cell ID (e.g., for each NR-CGI).

Thereafter, subsequent operations for the variation illustrated for the embodiment of FIGS. 4A-4B including operations 410, 411, 412, 413, 414, 415, 416, 417, 418, 419, 420, 421, 422, 423, 424, 425, and 426 may be performed in a similar manner as corresponding analogous operations 210, 211, 212, 213, 214, 215, 216, 217, 218, 219, 220, 221, 222, 223, 224, 225, and 226 of FIGS. 2A-2B in order to facilitate the UE 102.1 handover to target shared cell 138.2 for the embodiment of FIGS. 4A-4B.

Although the embodiment of FIGS. 4A-4B illustrates the Xn exchange process in relation to the RRC measurement control technique, the Xn exchange process could also be utilized for embodiments involving the conditional handover technique, as discussed for FIGS. 3A-3B, generally illustrated at 430 of FIG. 4B.

Further, although the embodiments of FIGS. 2A-2B, 3A-3B, and 4A-4B discuss example features involving a handover from shared cell 138.1 to shared cell 138.2, it is to be understood that similar operations could be utilized to perform a handover from a source unique cell to a target unique cell, or multiple potential target unique cells. For example, similar operations as discussed herein could be utilized to perform a handover for UE 102.2 from unique cell 136.2.1 to any of respective unique cell 136.1.3, 136.1.2, or 136.1.1 based on UE 102.2 mobility towards any of respective RU 130.1.3, RU 130.1.2, or RU 130.1.1.

Figure 5:
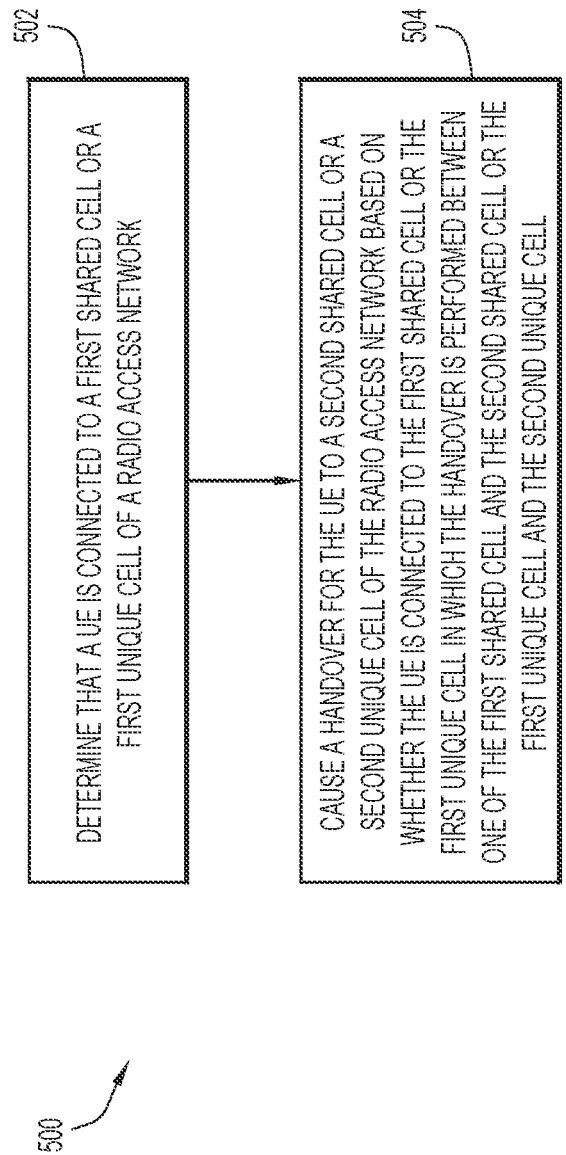
FIG. 5 is a flow chart depicting a method according to an example embodiment.

Referring to FIG. 5, FIG. 5 is a flow chart depicting a method 500 according to an example embodiment. In at least one embodiment, method 500 illustrates example operations that may be performed, at least in part, by a CU, such as CU 134.1 and/or 134.2 in order to support handovers for UE in a hybrid cell configuration environment (e.g., as shown in FIG. 1), according to an example embodiment.

Consider, at 502 that the method may include determining, by a CU, that a UE is connected to a first shared cell or a first unique cell of a radio access network. In one embodiment, the CU can determine that the UE is connected to the first shared cell or the first unique cell based on RRC signaling with the UE upon attachment/connection of the UE to the radio access network.

At 504, the method may include causing a handover for the UE to a second shared cell or a second unique cell of the radio access network based on whether the UE is connected to the first shared cell or the first unique cell in which the handover is performed between one of the first shared cell and the second shared cell or the first unique cell and the second unique cell.

In one instance, causing the handover for the UE includes instructing the UE to report cell information for one or more neighbor cells in which the reported cell information identifies whether each neighbor cell is a shared cell or a unique cell (e.g., as discussed at 205-208 for FIG. 2A and 302 of FIG. 3A). In one instance, the method can include configuring a neighbor relationship table based on the cell information reported by the UE in which the neighbor relationship table identifies whether each neighbor cell is a shared cell or a unique cell (e.g., as shown in TABLE 1).

In another instance, the method can include exchanging cell information between a first CU and a second CU (e.g., as shown at 401 of FIG. 1) in which the cell information includes first cell information for a first plurality of cells associated with the first CU that identifies whether each of the first plurality of cells is a shared cell or a unique cell and wherein the cell information includes second cell information for a second plurality of cells associated with the second CU that identifies whether each of the second plurality of cells is a shared cell or a unique cell. In this instance, causing the handover for the UE can include instructing the UE by the first CU to report cell information for one or more neighbor cells associated with the second CU in which the cell information does not identify whether each neighbor cell is a shared cell or a unique cell, and configuring a neighbor relationship table based on the cell information reported by the UE and the cell information exchanged between the first CU and the second CU in which the neighbor relationship table identifies whether each neighbor cell is a shared cell or a unique cell (e.g., as shown in TABLE 2 or TABLE 3)

In one instance, causing the handover for the UE includes requesting resource reservation for at least two neighbor cells and, upon determining that the resource reservation is successful for the at least two neighbor cells, identifying the at least two neighbor cells to the UE (e.g., as shown at 307 for FIG. 3A). For such an instance, the method can include upon determining a successful handover of the UE, canceling the resource reservation for any neighbor cell with which the UE did not perform the handover.

Figure 6:
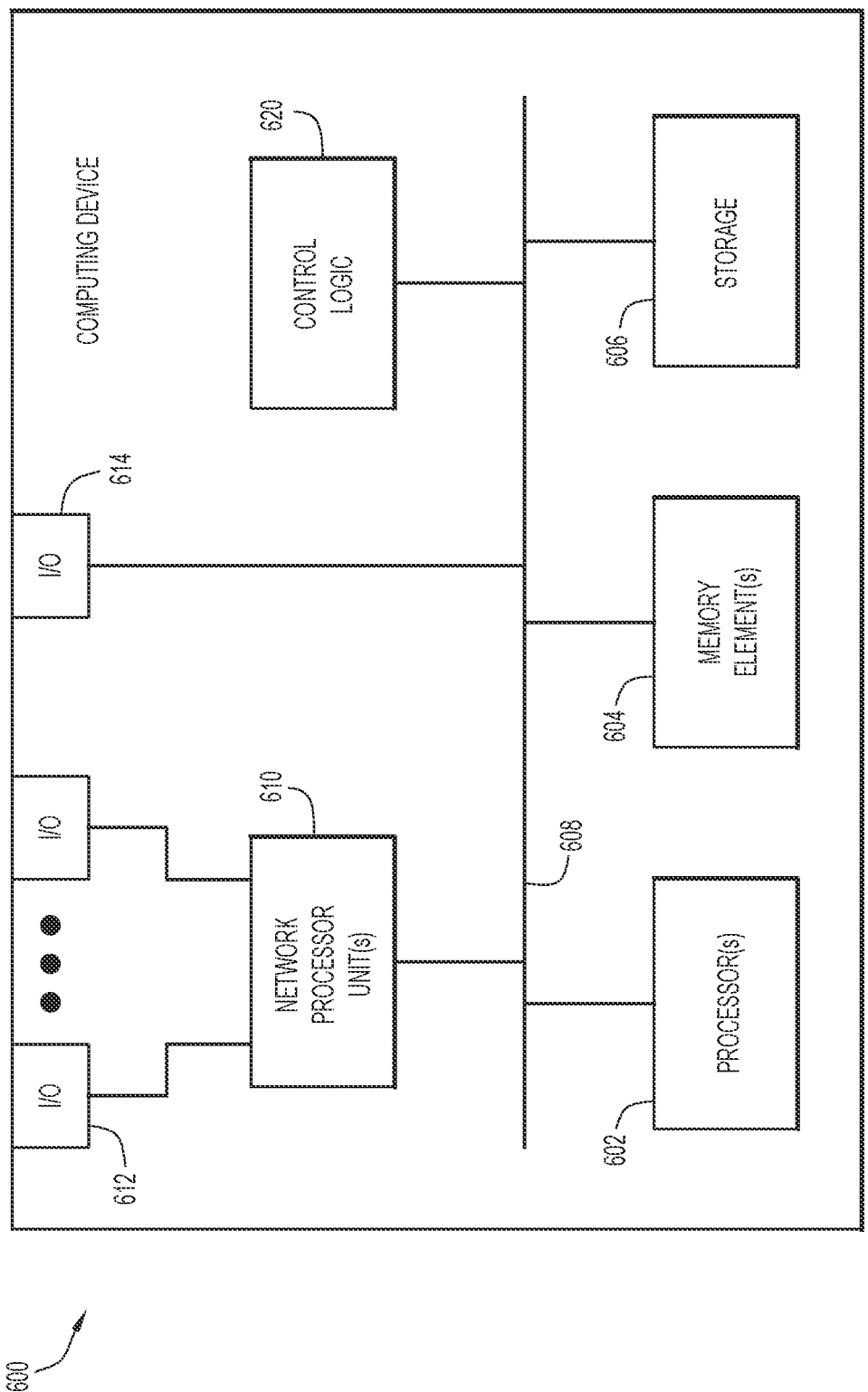
FIG. 6 is a hardware block diagram of a computing device that may perform functions associated with any combination of operations, in connection with the techniques discussed herein.

Referring to FIG. 6, FIG. 6 illustrates a hardware block diagram of a computing device 600 that may perform functions associated with operations discussed herein. In various embodiments, a computing device or apparatus, such as computing device 600 or any combination of computing devices 600, may be configured as any entity/entities as discussed herein in order to perform operations of the various techniques discussed herein, such as, for example any of RAN-EMS 104, CU 134.1, CU 134.2, DU 132.1, DU 132.2, and/or any other network element discussed for embodiments herein.

In at least one embodiment, computing device 600 may by any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device. Processor(s) 602 (e.g., hardware processor(s)) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 620 can include instructions that, when executed, cause processor(s) 602 to perform operations including determining that a user equipment (UE) is connected to a first shared cell or a first unique cell of a radio access network and causing a handover for the UE to a second shared cell or a second unique cell of the radio access network based on whether the UE is connected to the first shared cell or the first unique cell, wherein the handover is performed between one of the first shared cell and the second shared cell or the first unique cell and the second unique cell.

Figure 7:
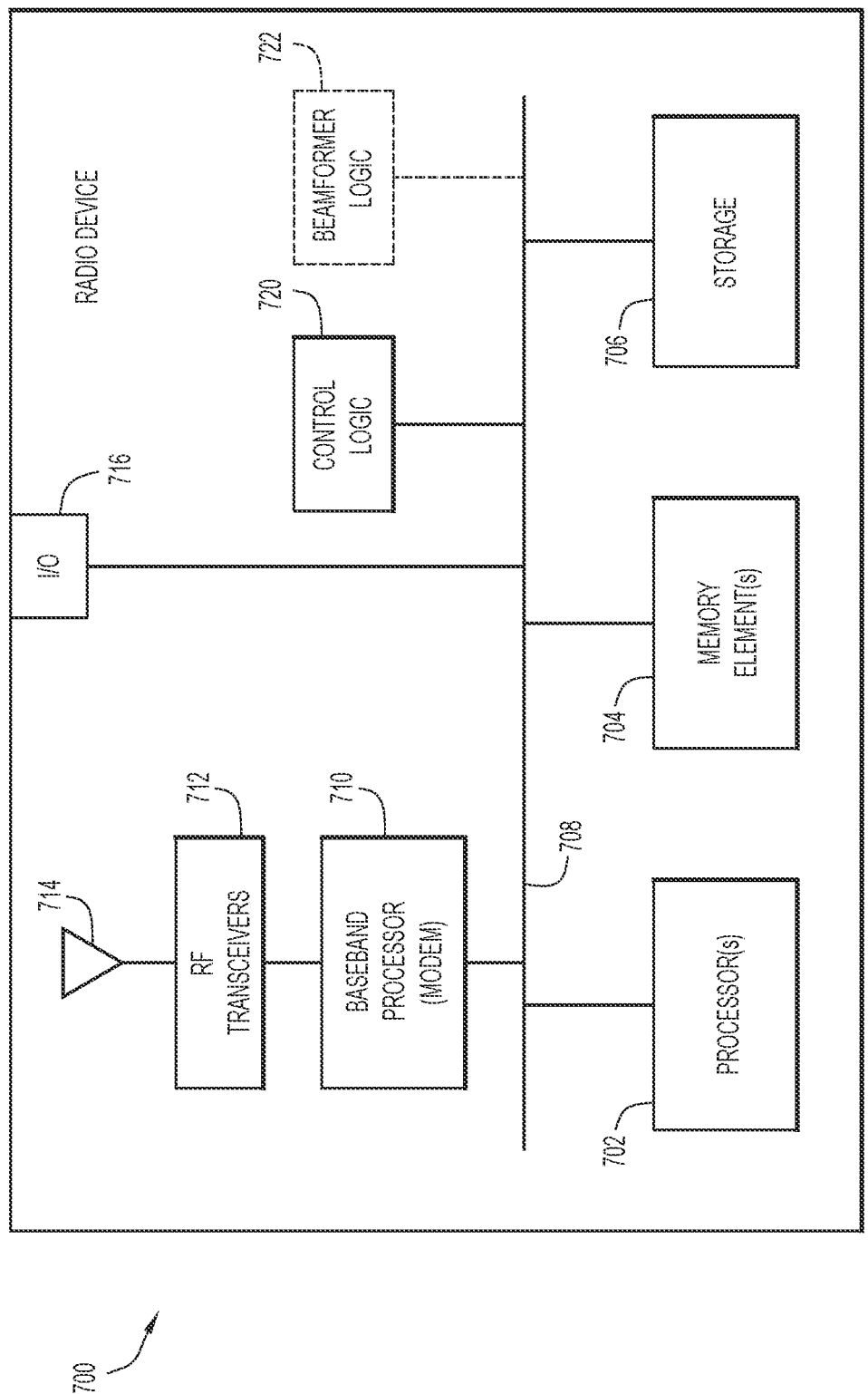
FIG. 7 is a hardware block diagram of a radio device that may perform functions associated with any combination of operations, in connection with the techniques discussed herein.

Referring to FIG. 7, FIG. 7 illustrates a hardware block diagram of a radio device 700 that may perform functions associated with operations discussed herein. In various embodiments, a radio device or apparatus, such as radio device 700 or any combination of radio devices 700, may be configured as any radio node/nodes as depicted herein in order to perform operations of the various techniques discussed herein, such as operations that may be performed by any of an RU (e.g., any of RU 130.1.1, RU 130.1.2, RU 130.1.3, RU 130.2.1, RU 130.2.2, RU 130.2.3, RU 130.3.1, RU 130.3.2, and RU 130.3.3) or a UE (e.g., any of UEs 102.1 and 102.2).

In at least one embodiment, radio device 700 may by any apparatus that may include one or more processor(s) 702, one or more memory element(s) 704, storage 706, a bus 708, a baseband processor or modem 710, one or more radio RF transceiver(s) 712, one or more antennas or antenna arrays 714, one or more I/O interface(s) 716, and control logic 720. For embodiments in which radio device 700 may be implemented as an RU, the radio device 700 may additionally include beamformer logic 722 to perform beam resource related operations, as discussed herein. In various embodiments, instructions associated with logic for radio device 700 can overlap in any manner and are not limited to the specific allocation of instructions and/or operations described herein.

The one or more processor(s) 702, one or more memory element(s) 704, storage 706, bus 708, and I/O interface(s) 716 may be configured/implemented in any manner described herein, such as described herein at least with reference to FIG. 6.

The RF transceiver(s) 712 may perform RF transmission and RF reception of wireless signals via antenna(s)/antenna array(s) 714, and the baseband processor (modem) 710 performs baseband modulation and demodulation, etc. associated with such signals to enable wireless communications for radio device 700.

In various embodiments, control logic 720, can include instructions that, when executed, cause processor(s) 702 to perform operations, which can include, but not be limited to, providing overall control operations of radio device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In various embodiments, beamformer logic 722, if implemented, can include instructions that, when executed, cause processor(s) 702 to perform beam related operations as discussed herein, which can include, but not be limited to, providing beamforming operations (e.g., transmissions, receptions, signaling, measurements, etc.); interacting with other entities, systems, etc. (e.g., DU 132.1 or DU 132.2); maintaining and/or interacting with stored data, information, parameters, etc. (e.g., memory element(s), storage, data structures, databases, tables, etc. storing beam-ID/beam resource information, etc.); combinations thereof; and/or the like to facilitate various operations for embodiments described herein.

The programs described herein (e.g., control logic 620/720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604/704 and/or storage 606/706 can store data, software, code, instructions (e.g., processor instructions), logic, parameters, combinations thereof, and/or the like used for operations described herein. This includes memory element(s) 604/704 and/or storage 606/706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include determining that a user equipment (UE) is connected to a first shared cell or a first unique cell of a radio access network; and causing a handover for the UE to a second shared cell or a second unique cell of the radio access network based on whether the UE is connected to the first shared cell or the first unique cell, wherein the handover is performed between one of the first shared cell and the second shared cell or the first unique cell and the second unique cell.

In one instance, a first radio unit (RU) provides both the first shared cell and the first unique cell and a second RU provides both the second shared cell and the second unique cell. In one instance, the first RU interfaces with a first distributed unit (DU) that further interfaces with a first central unit (CU), and wherein the second RU interfaces with a second DU that further interfaces with a second CU.

In one instance, causing the handover for the UE further includes exchanging cell information between a first central unit (CU) of the radio access network and a second CU of the radio access network, wherein the cell information includes first cell information for a first plurality of cells associated with the first CU that identifies whether each of the first plurality of cells is a shared cell or a unique cell and wherein the cell information includes second cell information for a second plurality of cells associated with the second CU that identifies whether each of the second plurality of cells is a shared cell or a unique cell. In one instance, causing the handover for the UE includes instructing the UE by the first CU to report cell information for one or more neighbor cells associated with the second CU, wherein the cell information does not identify whether each neighbor cell is a shared cell or a unique cell, and configuring a neighbor relationship table based on the cell information reported by the UE and the cell information exchanged between the first CU and the second CU, wherein the neighbor relationship table identifies whether each neighbor cell is a shared cell or a unique cell.

In one instance, causing the handover for the UE includes instructing the UE to report cell information for one or more neighbor cells, wherein the cell information identifies whether each neighbor cell is a shared cell or a unique cell. In one instance, the second shared cell and the second unique cell are neighbor cells reported by the UE.

In one instance, the method further includes configuring a neighbor relationship table based on the cell information reported by the UE, wherein the neighbor relationship table identifies whether each neighbor cell is a shared cell or a unique cell.

In one instance, causing the handover for the UE further includes requesting resource reservation for at least two neighbor cells; and upon determining that the resource reservation is successful for the at least two neighbor cells, identifying the at least two neighbor cells to the UE. In one instance, the method further includes, upon determining a successful handover of the UE, canceling the resource reservation for any neighbor cell with which the UE did not perform the handover.

In summary, techniques herein may provide for the ability to assist a UE during a handover in order to allow the UE to handover to a target cell that is operating in a same mode as the source cell.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   determining that a user equipment (UE) is connected to a first shared cell operated in a shared cell operating mode or a first unique cell operated in a unique cell operating mode of a radio access network; and
   causing a handover for the UE to a second shared cell operated in the shared cell operating mode or a second unique cell operated in the unique cell operating mode of the radio access network based on whether the UE is connected to the first shared cell or the first unique cell, wherein the handover is performed between the first shared cell and the second shared cell or the handover is performed between the first unique cell and the second unique cell and causing the handover comprises:
      instructing the UE to report cell information for one or more neighbor cells; and
      configuring a neighbor relationship table based, at least in part, on the cell information reported by the UE, wherein the neighbor relationship table identifies whether each neighbor cell of the one or more neighbor cells is a shared cell operated in the shared cell operating mode or is a unique cell operated in the unique cell operating mode.

2. The method of claim 1, wherein a first radio unit (RU) provides both the first shared cell and the first unique cell and a second RU provides both the second shared cell and the second unique cell.

3. The method of claim 2, wherein the first RU interfaces with a first distributed unit (DU) that further interfaces with a first central unit (CU), and wherein the second RU interfaces with a second DU that further interfaces with a second CU.

4. The method of claim 1, wherein causing the handover for the UE further comprises:
   exchanging cell information between a first central unit (CU) of the radio access network and a second CU of the radio access network, wherein the cell information exchanged between the first CU of the radio access network and the second CU of the radio access network includes first cell information for a first plurality of cells associated with the first CU that identifies whether each of the first plurality of cells is a shared cell operated in the shared cell operating mode or is a unique cell operated in the unique cell operating mode and wherein the cell information includes second cell information for a second plurality of cells associated with the second CU that identifies whether each of the second plurality of cells is operated in the shared cell operating mode or is operated in the unique cell operating mode.

5. The method of claim 4, wherein the cell information reported by the UE does not identify whether each neighbor cell is a shared cell operated in the shared cell operating mode or is a unique cell operated in the unique cell operating mode, and the neighbor relationship table is configured based additionally on the cell information exchanged between the first CU and the second CU.

6. The method of claim 1, wherein the cell information reported by the UE identifies whether each neighbor cell is a shared cell operated in the shared cell operating mode or is a unique cell operated in the unique cell operating mode.

7. The method of claim 6, wherein the second shared cell and the second unique cell are neighbor cells reported by the UE.

8. The method of claim 1, wherein causing the handover for the UE further comprises:
  requesting resource reservation for at least two neighbor cells; and
  upon determining that the resource reservation is successful for the at least two neighbor cells, identifying the at least two neighbor cells to the UE.

9. The method of claim 8, further comprising:
  upon determining a successful handover of the UE, canceling the resource reservation for any neighbor cell with which the UE did not perform the handover.

10. The method of claim 2, wherein the first RU is configured with a first plurality of beamforming beams and the second RU is configured with second plurality of beamforming beams.

11. One or more non-transitory computer readable storage media encoded with instructions that, when executed by a processor, cause the processor to perform operations, comprising:
  determining that a user equipment (UE) is connected to a first shared cell operated in a shared cell operating mode or a first unique cell operated in a unique cell operating mode of a radio access network; and
  causing a handover for the UE to a second shared cell operated in the shared cell operating mode or a second unique cell operated in the unique cell operating mode of the radio access network based on whether the UE is connected to the first shared cell or the first unique cell, wherein the handover is performed between the first shared cell and the second shared cell or the handover is performed between the first unique cell and the second unique cell and causing the handover comprises:
    instructing the UE to report cell information for one or more neighbor cells; and
    configuring a neighbor relationship table based, at least in part, on the cell information reported by the UE, wherein the neighbor relationship table identifies whether each neighbor cell of the one or more neighbor cells is a shared cell operated in the shared cell operating mode or is a unique cell operated in the unique cell operating mode.

12. The media of claim 11, wherein causing the handover for the UE further comprises:
  exchanging cell information between a first central unit (CU) of the radio access network and a second CU of the radio access network, wherein the cell information includes exchanged between the first CU of the radio access network and the second CU of the radio access network first cell information for a first plurality of cells associated with the first CU that identifies whether each of the first plurality of cells is a shared cell operated in the shared cell operating mode or is a unique cell operated in the unique cell operating mode and wherein the cell information includes second cell information for a second plurality of cells associated with the second CU that identifies whether each of the second plurality of cells is a shared cell operated in the shared cell operating mode or is a unique cell operated in the unique cell operating mode.

13. The media of claim 12, wherein the cell information reported by the UE does not identify whether each neighbor cell is a shared cell operating in the shared cell operating mode or is a unique cell operated in the unique cell operating mode, and the neighbor relationship table is configured based additionally on the cell information exchanged between the first CU and the second CU.

14. The media of claim 11, wherein the cell information reported by the UE identifies whether each neighbor cell is a shared cell operated in the shared cell operating mode or is a unique cell operated in the unique cell operating mode.

15. The media of claim 14, wherein the second shared cell and the second unique cell are neighbor cells reported by the UE.

16. An apparatus comprising:
  at least one memory element for storing data; and
  at least one processor for executing instructions associated with the data, wherein executing the instructions causes the apparatus to perform operations, comprising:
    determining that a user equipment (UE) is connected to a first shared cell operated in a shared cell operating mode or a first unique cell operated in a unique cell operating mode of a radio access network; and
    causing a handover for the UE to a second shared cell operated in the shared cell operating mode or a second unique cell operated in the unique cell operating mode of the radio access network based on whether the UE is connected to the first shared cell or the first unique cell, wherein the handover is performed between the first shared cell and the second shared cell or the handover is performed between the first unique cell and the second unique cell and causing the handover comprises:
      instructing the UE to report cell information for one or more neighbor cells; and
      configuring a neighbor relationship table based, at least in part, on the cell information reported by the UE, wherein the neighbor relationship table identifies whether each neighbor cell of the one or more neighbor cells is a shared cell operated in the shared cell operating mode or is a unique cell operated in the unique cell operating mode.

17. The apparatus of claim 16, wherein the apparatus is a first central unit (CU) of the radio access network and causing the handover for the UE further comprises:

exchanging cell information between the first CU of the radio access network and a second CU of the radio access network, wherein the cell information exchanged between the first CU of the radio access network and the second CU of the radio access network includes first cell information for a first plurality of cells associated with the first CU that identifies whether each of the first plurality of cells is a shared cell operated in the shared cell operating mode or is a unique cell operated in the unique cell operating mode and wherein the cell information includes second cell information for a second plurality of cells associated with the second CU that identifies whether each of the second plurality of cells is a shared cell operated in the shared cell operating mode or a unique cell operated in the unique cell operating mode.

18. The apparatus of claim 17, wherein the cell information reported by the UE does not identify whether each neighbor cell is a shared cell operated in the shared cell operating mode or is a unique cell operated in the unique cell operating mode, and the neighbor relationship table is configured based additionally on the cell information exchanged between the first CU and the second CU.

19. The apparatus of claim 16, wherein the cell information reported by the UE identifies whether each neighbor cell is a shared cell operated in the unique cell operating mode or a unique cell operated in the unique cell operating mode.

20. The apparatus of claim 16, wherein causing the handover for the UE further comprises:

requesting resource reservation for at least two neighbor cells; and upon determining that the resource reservation is successful for the at least two neighbor cells, identifying the at least two neighbor cells to the UE.

* * * * *